United States Patent
Lewis et al.

(10) Patent No.: US 10,547,569 B1
(45) Date of Patent: Jan. 28, 2020

(54) LOW-FRICTION, INSTANT, PRIVATE, PERSONALIZED VIDEO SHARING WIDGET

(71) Applicant: Google Inc., Mountain View, CA (US)

(72) Inventors: Justin Lewis, Marina del Rey, CA (US); Gavin James, Los Angeles, CA (US)

(73) Assignee: GOOGLE LLC, Mountain View, CA (US)

( * ) Notice: Subject to any disclaimer, the term of this patent is extended or adjusted under 35 U.S.C. 154(b) by 949 days.

(21) Appl. No.: 14/547,452

(22) Filed: Nov. 19, 2014

Related U.S. Application Data

(63) Continuation of application No. 14/300,132, filed on Jun. 9, 2014, now abandoned.

(51) Int. Cl.
| | | |
|---|---|---|
| *G06F 3/14* | (2006.01) | |
| *H04L 12/58* | (2006.01) | |
| *H04L 12/18* | (2006.01) | |
| *H04L 29/06* | (2006.01) | |

(52) U.S. Cl.
CPC ........ *H04L 51/046* (2013.01); *H04L 12/1813* (2013.01); *H04L 65/60* (2013.01)

(58) Field of Classification Search
CPC .................................. G06F 3/14; G06F 3/17
USPC ................. 715/719, 823; 707/723; 705/26.5; 726/18; 370/260; 709/205
See application file for complete search history.

(56) References Cited

U.S. PATENT DOCUMENTS

| | | | |
|---|---|---|---|
| 7,627,608 B2 * | 12/2009 | Strandell | G06Q 10/107 |
| 8,909,740 B1 | 12/2014 | Bliss et al. | |
| 9,229,938 B1 | 1/2016 | Jaini et al. | |
| 2009/0320050 A1 | 12/2009 | Pousti et al. | |
| 2010/0299391 A1 * | 11/2010 | Demarta | G06F 15/16 |
| | | | 709/205 |
| 2010/0299522 A1 | 11/2010 | Khambete | |
| 2011/0110275 A1 * | 5/2011 | Shaheen | H04L 65/1086 |
| | | | 370/260 |
| 2011/0239253 A1 | 9/2011 | West et al. | |
| 2011/0289530 A1 | 11/2011 | Dureau et al. | |
| 2012/0215903 A1 | 8/2012 | Fleischman et al. | |
| 2013/0018960 A1 | 1/2013 | Knysz et al. | |

(Continued)

FOREIGN PATENT DOCUMENTS

| | | |
|---|---|---|
| CN | 105898509 | 8/2016 |
| EP | 2993907 | 3/2016 |

(Continued)

OTHER PUBLICATIONS

PCT International Search Report and Written Opinion for International Application No. PCT/US2017/049987, dated Dec. 4, 2017, 15 pages.

*Primary Examiner* — Ruay Ho
(74) *Attorney, Agent, or Firm* — Lowenstein Sandler LLP

(57) ABSTRACT

A computer-implemented method for a user device including receiving a notification by a processing device of a user device a first user, the notification notifying the first user that a second user has shared a media item with the first user, the notification including a reference to the media item. The method further includes receiving a request of the first user to view the media item. The method further includes in response to the request of the first user, causing a messaging session between the first user and the second user to be provided, and presenting the media item to the first user in the messaging session.

19 Claims, 17 Drawing Sheets

(56) References Cited

U.S. PATENT DOCUMENTS

| | | |
|---|---|---|
| 2013/0218885 A1 | 8/2013 | Satyanarayanan |
| 2013/0246522 A1 | 9/2013 | Bilinski et al. |
| 2013/0282514 A1* | 10/2013 | Dougherty ............. G06Q 30/02 705/26.5 |
| 2013/0311457 A1* | 11/2013 | Svendsen ............. G11B 27/031 707/723 |
| 2014/0214920 A1 | 7/2014 | Wong et al. |
| 2014/0215509 A1 | 7/2014 | Angiolillo et al. |
| 2014/0223099 A1 | 8/2014 | Kidron |
| 2014/0237587 A1* | 8/2014 | Forbes .................... G06F 21/32 726/18 |
| 2014/0363141 A1 | 12/2014 | Bonhomme et al. |
| 2014/0372168 A1 | 12/2014 | Markham |
| 2015/0067601 A1* | 3/2015 | Bernstein .............. G06F 3/0488 715/823 |
| 2015/0081904 A1 | 3/2015 | Guedalia et al. |
| 2015/0177937 A1 | 6/2015 | Poletto et al. |
| 2015/0181301 A1 | 6/2015 | Bloch et al. |
| 2015/0382039 A1 | 12/2015 | Lewis et al. |
| 2017/0026703 A1 | 1/2017 | Phadnis |

FOREIGN PATENT DOCUMENTS

| | | |
|---|---|---|
| WO | WO2015131922 | 9/2014 |
| WO | WO2014178461 | 11/2014 |
| WO | WO2017088409 | 6/2017 |

* cited by examiner

400

| Identify a plurality of contacts of a user of a content-sharing platform |
|---|
| 402 |

↓

| Calculate a sharing strength metric for each contact |
|---|
| 404 |

↓

| Rank each contact according to the sharing strength metric of the contact |
|---|
| 406 |

↓

| Provide for presentation to the user, in a user interface, a first subset of the plurality of contacts, the first subset having higher sharing strength metric than a second subset of the plurality of contacts |
|---|
| 408 |

FIG. 4

LOW-FRICTION, INSTANT, PRIVATE, PERSONALIZED VIDEO SHARING WIDGET

CROSS REFERENCE TO RELATED APPLICATIONS

This application is a continuation of U.S. patent application Ser. No. 14/300,132 filed Jun. 9, 2014, the entire contents of which are hereby incorporated by reference.

TECHNICAL FIELD

This disclosure relates to the field of content-sharing platforms and, in particular, to methods and systems for sharing media items hosted by the content-sharing platform.

BACKGROUND

On the Internet, content-sharing platforms, like social networks and others, allow users to connect to and share information with each other. Many social networks include a content-sharing aspect that allows users to upload, view, and share content, such as video content, image content, audio content, and so on (which may be referred to as "media items" or "content items"). Such media items may include professionally produced audio clips, movie clips, TV clips, and music videos, as well as amateur content such as video blogging, short original videos, pictures, photos, audio recordings, other multimedia content, etc. Users may use computing devices (such as smartphones, cellular phones, laptop computers, desktop computers, netbooks, and tablet computers) to access the content-sharing platforms to use, play, share, and/or consume media items (e.g., watch digital videos, and/or listen to digital music).

One of the important aspects of such content-sharing platforms is the ability for users to share media items with other users, with followers, and with friends. While efforts have been undertaken to facilitate users in sharing media items with others, these efforts have not been entirely satisfactory.

SUMMARY

The following is a simplified summary of the disclosure in order to provide a basic understanding of some aspects of the disclosure. This summary is not an extensive overview of the disclosure. It is intended to neither identify key or critical elements of the disclosure nor delineate any scope of the particular embodiments of the disclosure or any scope of the claims. Its sole purpose is to present some concepts of the disclosure in a simplified form as a prelude to the more detailed description that is presented later.

In one implementation, a computer-implemented method for instantly sharing media items is provided. Embodiments of the method may include steps or operations of receiving a request of a user to view a media item, identifying a set of contacts of the user, and of providing a user interface having a first portion to present the media item and a second portion to present interface elements graphically identifying at least some contacts of the set of contacts. The method may further includes steps of receiving a selection of one of the contacts by the user via a corresponding interface element, wherein the selection indicating a request of the user to share the media item with the selected contact, and of causing the media item to be presented to the selected contact.

In another implementation, a computer-implemented method for sharing media items on a user device is provided. The method may include operations or steps of presenting, on the user device, a user interface having a first portion comprising a media item and a second portion comprising interface elements graphically identifying contacts of a user. The method may also include steps of receiving a selection of one the contacts by the user via a corresponding interface element, wherein the selection indicates a request of the user to share the media item with the selected contact, and of providing an indication to the user that the media item has been shared with the selected contact.

In additional implementations or embodiments, computing devices for performing the operations of the above-described implementations are also disclosed. Systems with a processing device and a memory including instructions that when executed by the processing devices cause the processing device to perform operations corresponding to the disclosed methods are also provided. Additionally, in some implementations of the disclosure, a non-transitory computer-readable storage medium stores instructions for performing the operations of the above described implementations.

BRIEF DESCRIPTION OF THE DRAWINGS

Aspects of the present disclosure are illustrated, by way of example and not by way of limitation, in the figures of the accompanying drawings.

FIG. 4 is a flow diagram of a method of selecting contacts for inclusion in a frictionless sharing portion of a user interface for a content-sharing platform, according to some embodiments of the disclosure.

Figure 1:
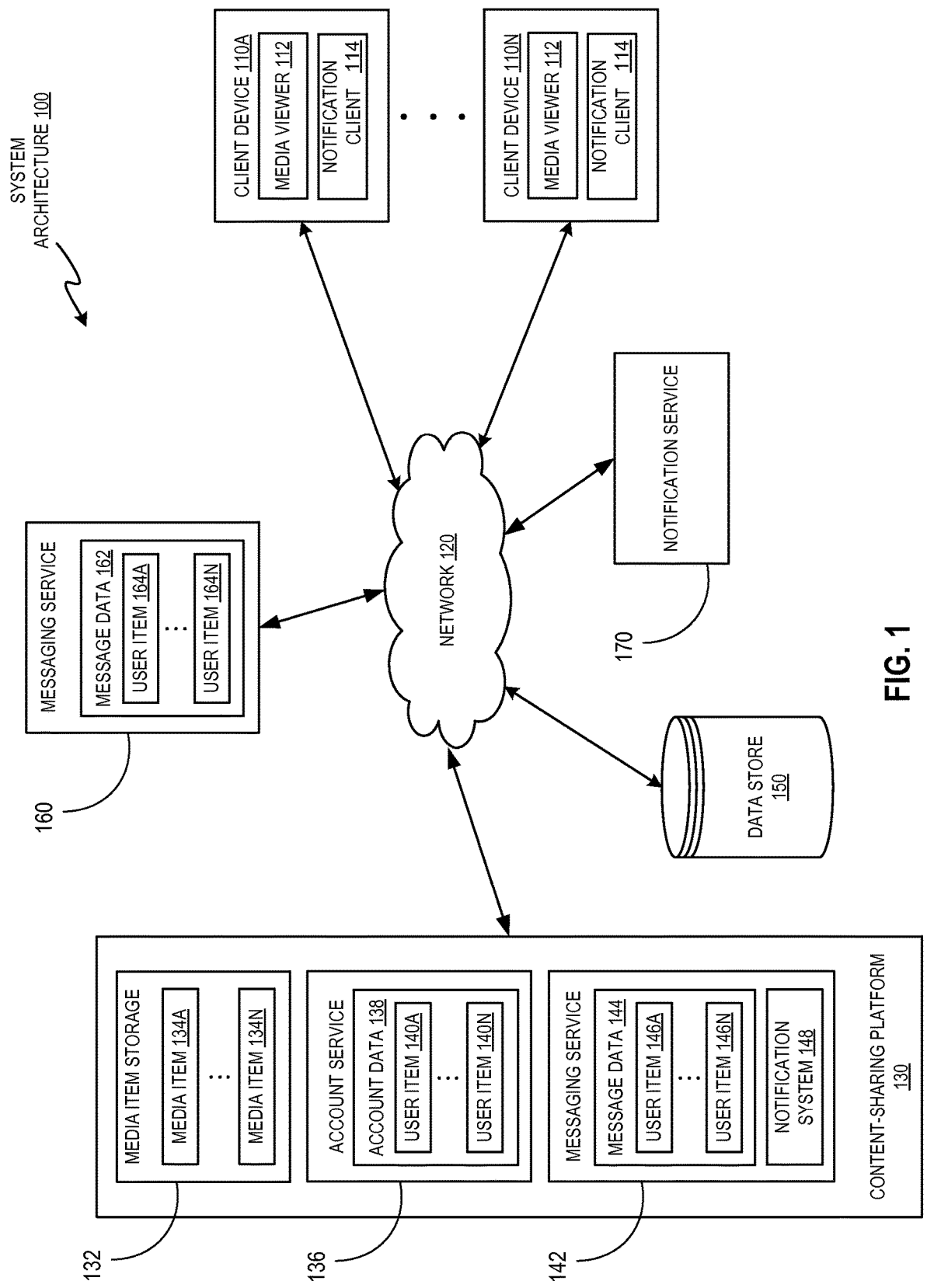
FIG. 1 illustrates an exemplary system architecture, in accordance with an embodiment of the disclosure.

These drawing may be better understood when observed in connection with the following Detailed Description.

DETAILED DESCRIPTION

Implementations are described for facilitating the sharing of media items in Internet-based media platforms, such as a content-sharing platform. Internet-based media platforms have become increasingly important channels for the distribution and consumption of media content such as movies, television, videos, music, photography, and text. As more media distribution has migrated onto such platforms, the amount of content available has increased dramatically. In order to best satisfy users of the platform, helping those users to find the content they like most among the total amount of content is increasingly important.

When a user finds a media item that he or she likes, that user may want to share the media item with friends and other contacts. This disclosure is directed to making the process of sharing a media item with others a low-friction, instant, private, and personalized process. By helping users to share more effectively and efficiently, those users may be more engaged in the media items presented by the content-sharing platform. They may share more with each other and enjoy the content more by sharing it. This may also provide more advertising opportunities, providing additional revenues to operators of content-sharing platforms with these features.

Implementations of the present disclosure enable a user to share a media item with as little effort as a single click or tap of an input device. When a user requests to consume a media item on a content-sharing platform, the platform may receive that request and present the media item as well as one or more interface elements that identify at least some of the user's contacts. For example, each of the interface elements may be a selectable thumbnail photo corresponding to one of the user's contacts. When the user selects one of the contacts by selecting the corresponding interface element, the media item is shared with that contact. The media item may be shared with a pre-formatted message, such that no other action may be required of the user in order to share the media item. Alternatively, the user may include a personalized message with the shared media item that is then received by the contact in connection with the receipt of the media item. The content-sharing platform may provide the media item to the selected contact by causing a pop-up or another alert or notice to appear in a user interface of a client device being used by the contact. In this way, users of the content-sharing platform may be able to share a specific media item with an individually-selected contact with limited effort.

Frequently in this disclosure, examples directed to videos are presented. This is done for ease of explanation of some of the features described herein. However, embodiments with other content, such as pre-recorded audio clips, pre-recorded movie clips, TV clips, and music videos, photos, other multimedia content, including streaming content, are also within the scope of this disclosure, regardless of whether specific examples of such are provided herein.

In some embodiments, when the content-sharing platform receives the user's selection of one of the contacts, the content-sharing platform provides the media item to the selected contact in connection with or in a messaging session initiated in response to the selection by the user. The user and the contact may use the messaging session to exchange messages about the shared media item or other topics, further increasing the engagement of the users with the media items presented by the content-sharing platform.

Thus, embodiments of the present disclosure may provide for instant, frictionless sharing. Additionally, embodiments of the present disclosure may facilitate messaging and interaction between users of the content-sharing platform. These features may increase the engagement with and through the content-sharing platform.

FIG. 1 illustrates an exemplary system architecture 100 for the sharing, distributing, and displaying of media items, in accordance with an embodiment of the disclosure. The system architecture 100 includes a plurality of client devices 110A through 110N, a network 120, a content-sharing platform 130, and a data store 150. As shown in FIG. 1, the system architecture 100 further includes a messaging service 160 and a notification service 170. These features may operate together to facilitate frictionless sharing and messaging between users of the content-sharing platform 130.

In one embodiment, network 120 may be a public network (e.g., the Internet), a private network (e.g., a local area network (LAN) or wide area network (WAN)), a wired network (e.g., Ethernet network), a wireless network (e.g., an 802.11 network or a Wi-Fi network), or a cellular network (e.g., a Long Term Evolution (LTE) network), having routers, hubs, switches, servers, and/or a combination thereof. In one embodiment, the data store 150 includes a memory (e.g., random access memory), a cache, a drive (e.g., a hard drive), a flash drive, a database system, a storage area network (SAN), or another type of component or device capable of storing data. The data store 150 may also include multiple storage components (e.g., multiple drives or multiple databases) that may also span multiple computing devices (e.g., multiple server computers) and storage devices such as may be present in a data center.

The client devices 110A-N may each include computing devices such as personal computers (PCs), laptops, mobile phones, smartphones, tablet computers, wearable computing devices, etc. Client devices 110A-N may be used to consume (e.g., view, hear, etc.) and upload content to the content-sharing platform 130. In some embodiments, client device 110A-N may also be referred to as "user devices." Each client device includes a media viewer 112. In one embodiment, the media viewers 112 may be applications that allow users to receive visible content, such as images, videos, web pages, documents, etc., and audio content such as live audio and sound recordings. For example, the media viewer 112 may be a web browser that can access, retrieve, present, and/or navigate content (e.g., web pages such as Hyper Text Markup Language (HTML) pages, digital media items, etc.) served by a web server. The media viewer 112 may render, display, and/or present the content (e.g., a web page, a media viewer) to a user of a client device. The media viewer 112 may also display an embedded media player (e.g., a Flash® player or an HTML5 player) that is embedded in a web page (e.g., a web page that may provide information about a product sold by an online merchant, a content-sharing platform such as a social network). In another example, the media viewer 112 may be a standalone application, such as smartphone application, that allows users to view digital media items (e.g., digital videos, digital images, electronic books, shared text, etc.) as part of the content-sharing platform 130.

The media viewers 112 may be provided to the client devices 110A-N by the content-sharing platform 130 and/or a third-party distribution platform. For example, the media viewers 112 may be embedded media players that are embedded in web pages provided by the content-sharing platform 130. In another example, the media viewers 112 may be applications that are downloaded from a server accessible to the client devices 110A-N through the network 120.

The client devices 110A-N may also each include a notification client 114. The notification client may communicate with the notification service 170 to receive notifications. For example, when a user of the client device 110A shares a media item with a user of the client device 110N, the content-sharing platform 130 may cause a notification request to be sent to the notification service 170, which in turn can relay an authorized notification to the client device 110N. The notification client 114 of the client device 110N receives and interprets the notification. The notification client 114 may cause a notification to appear in a display of the client device 110N. The notification client 114 may be configured to cause the notification to appear in a foreground of the display, such that regardless of what applications or windows are currently being displayed on the client device 110N, the notification becomes visible to the user of the client device 110N. The notification can include a reference to the media item that user of the client device 110A requested to share with the user of the client device 110N, such that by interacting with or selecting from options provided by the notification, the client device 110N may access the shared media item.

In general, functions described in one embodiment as being performed by the content-sharing platform 130 can also be performed on the client devices 110A-N in other embodiments if appropriate. Similarly, in some embodiments, the notification infrastructure may be provided as a sub-system of the content-sharing platform 130, as shown by the notification system 148, or as part of the media viewers 112 on the client devices 110A-N. Thus, the functionality attributed to a particular component of the system architecture 100 may be performed by different or multiple components operating together. The content-sharing platform 130 can also be accessed as a service provided to other systems or devices through appropriate application programming interfaces (APIs), and thus is not limited to use in websites.

In some embodiments, the content-sharing platform 130 includes one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content-sharing platform 130 may allow a user to consume, upload, search for, approve of ("like"), dislike, share, and/or comment on media items. The content-sharing platform 130 may also include a website (e.g., a web page) and/or a smartphone application that may be used to provide a user with access to the media items.

The content-sharing platform 130 may include a media item storage 132 that includes a plurality of media items 134A through N. Examples of media items 134A-N can include, and are not limited to, digital video, digital movies, digital photos, digital music, website content, social media updates, electronic books (ebooks), electronic magazines, digital newspapers, digital audio books, electronic journals, blogs, real simple syndication (RSS) feeds, electronic comic books, software applications, etc. Of note, the media items 134A-N may include one or more media items that include one or more tags in metadata associated with at least some of the one or more media items. In some embodiments, the content-sharing platform 130 may store the media items 134A-N using the data store 150. In such embodiments, the media items 134A-N may be pointers to corresponding media items as stored in the data store 150. The media items 134A-N may be retrieved from data store 150 prior to delivery to one or more of client devices 110A-N over network 120.

In some embodiments, media items 134A-N may be consumed (e.g., viewed and/or heard) via the Internet and/or via a mobile device application. As used herein, "media," "media item," "online media item," "digital media," "digital media item," "content," and "content item" can include and refer to an electronic file that can be executed, loaded, or played using software, firmware, or hardware configured to present the digital media item to a viewing user of the content-sharing platform 130. In some embodiments, the media item may be a pre-recorded or pre-captured media item that may be streamed as it is viewed or downloaded prior to viewing. In other embodiments, the media item may be a live streamed media item.

As illustrated in FIG. 1, the content-sharing platform 130 may further include an account service 136. The account service 136 can provide an infrastructure to provide users of the content-sharing platform 130 with individualized accounts. By logging into an account on the content-sharing platform, the user may be able to better curate media items for consumption. This curation may be performed actively by the user (e.g., saving a media item to a list for watching at a later time, etc.) or by the content-sharing platform 130 itself (e.g., recommending content that the user may enjoy based on content the user has consumed in the past, etc.). Such lists and recommendations may be stored in account data 138 as user items 140A-140N. Each user may have many different user items among the user items 140A-N stored in the account data 138. The user items 140A-N may include consumption histories, subscriptions, interaction histories that record when the user shares or approves of a media item, and contact information identifying one or more contacts of the users. A contact of a user may include any entity that the user has a relationship with (e.g., a friend of the user, a colleague of the user, a classmate of the user, etc.), has interacted with (e.g., via email, text messaging, video conferencing, social networking), and/or maintains contact information for. The contacts may be identified by the content-sharing platform 130 as users of the content-sharing platform 130 or may include other information, such as a name, phone number, email address, messaging system identifier, and/or other social network account information identifying individuals or groups with which the user is acquainted. In some embodiments, information regarding contacts may be pulled from a contact list stored on the client device 110A and imported into the account data 138.

In situations in which the systems discussed here collect personal information about users from the users or from users' devices, or make use of personal information, the users may be provided with an opportunity to control whether the content-sharing platform 130 collects user information (e.g., information about a user's social network, social actions or activities, profession, a user's preferences, a user's current location, or a user's consumption history), or to control whether and/or how to receive content from the content-sharing platform 130 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about and from the user and used by the content-sharing platform 130.

The content-sharing platform 130 also includes a messaging service 142 in the embodiment illustrated in FIG. 1. The messaging service 142 may facilitate messages being shared among the users of the content-sharing platform 130. For example, when a user of the content-sharing platform 130 shares a media item with a contact, a reference to the media item or the media item itself may be included in a messaging session, hosted by the messaging service 142, between the user and the contact. If no messaging session exists between the user and the contact at the time of sharing, the messaging service 142 may initiate a messaging session and include the media item or a reference thereto, such as a link or uniform resource locator. In some instances, the messaging session may be provided to the user as an HTML iframe in the media viewer 112, such that the media item may be viewed by the contact simultaneously with the messaging session. When the user shares a media item, a pre-formatted message may be sent by the messaging system to the intended contact. The pre-formatted message may inform the contact that the user has shared a media item with the contact and may further include the reference to the media item.

In some embodiments, the system architecture 100 includes a messaging service 160 that is external to the content-sharing platform 130. For example, the messaging service 160 may be a third-party messaging service, such as a short message service (SMS) system, multimedia messaging service (MMS) system, or third-party messaging application that may be used to exchange text-based messages, images, sound clips, video clips, etc. between two users of the system or application. In embodiments in which the messaging service 160 is used to communicate that a user has shared a media item from the content-sharing platform 130 with the contact, the message may be transmitted via the messaging service 160 rather than the messaging service 142. In some embodiments, a user may provide login credentials to the content-sharing platform 130 to use in accessing and sending messages through the messaging service 160. The messaging service 160 includes message data 162 containing a plurality of user items 164A-N, which may be messages such as messages including a reference to a shared media item.

As illustrated, the system architecture 100 may further include a notification service 170. This notification service 170 may be provided by the operator of the content-sharing platform 130 or may be a third-party notification service provider. The notification service 170 may facilitate the provisioning of notifications to the notification clients 114 of the client device 110A-N. As described herein, when a user shares a media item with a contact, a notification may be provided to a client device of the contact. Even if the content-sharing platform 130 is not visible on the display of the client device of the contact (e.g., the media viewer 112 is operating in a background of the device, etc.), the notification client 114 may receive the notification and display it according to one or more settings of the notification client 114. The settings may determine whether or not a notification is displayed and/or how notifications are displayed to a user of the client device. In some embodiments, a notification system 148 is integrated into the content-sharing platform 130 to provide for notification to client devices 110A-N in a manner similar to that described for the notification service 170.

Figure 2:
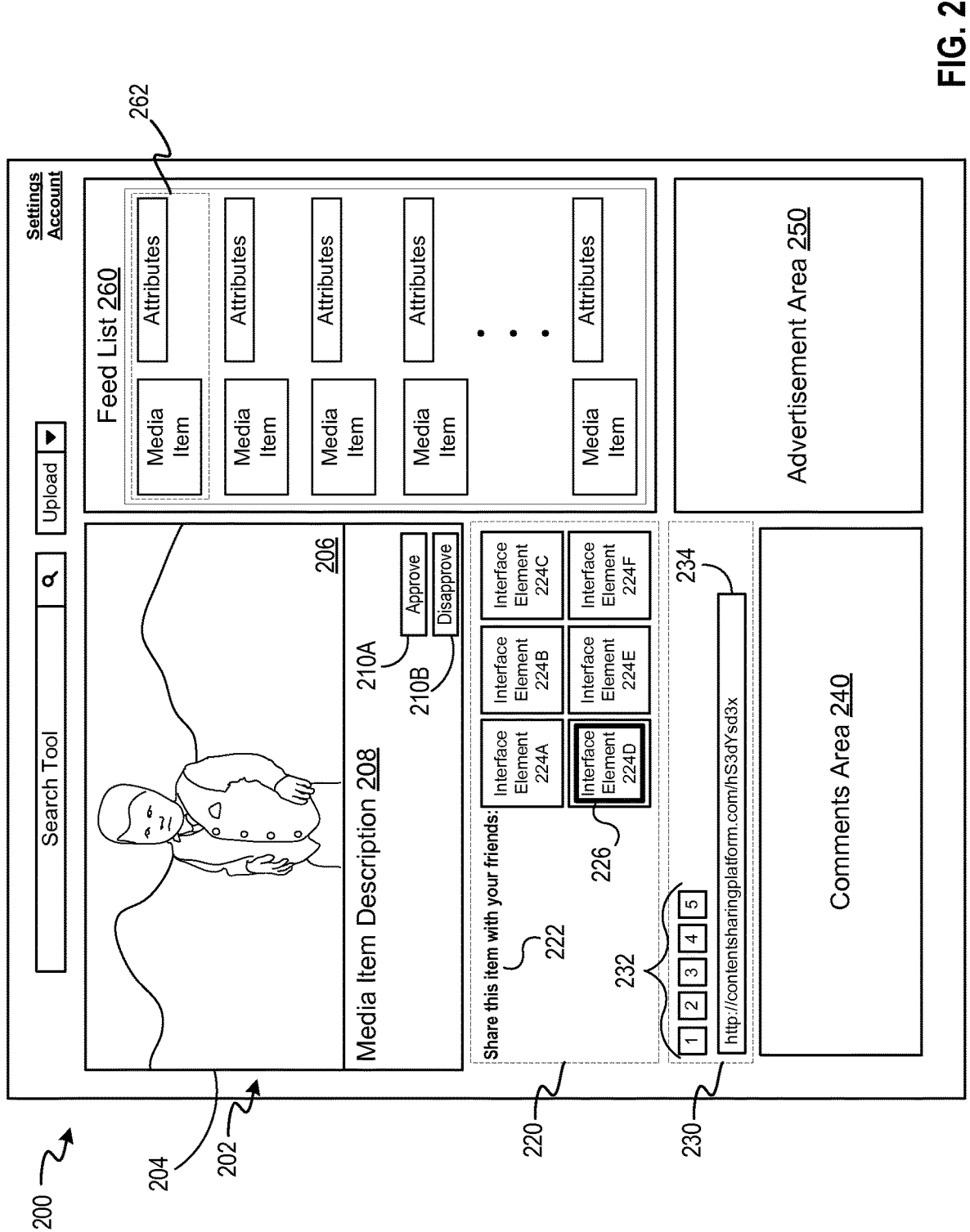
FIG. 2 illustrates an exemplary user interface for sharing a media item with one or more contacts, in accordance with some embodiments of the disclosure.

FIG. 2 illustrates an exemplary user interface 200 for sharing a media item with a contact, in accordance with some embodiments of the disclosure. The user interface 200 is illustrated as a graphical user interface and includes several portions or areas which each provide certain functions. The user interface 200 may be a watch page user interface by which a user may consume media items. In some embodiments, there may be more or fewer portions than illustrated in FIG. 2. For example, the illustrated portions may be combined with each other or further divided in other embodiments. As illustrated, the user interface 200 includes a media viewing portion 202. The media viewing portion 202 includes a media player 204, in which a media item 206 is presented to a user of the content-sharing platform 130. As illustrated, the media item 206 is a user-generated video depicting a family member of the user. The media viewing portion 202 also includes a media item description 208. The media item description 208 may include information such as an identifier of the user that uploaded or added the media item 206 to the content-sharing platform 130. The media item description 208 may further include a text-based description of the media item 206. The media item description 208 may also include buttons 210A and 210B. As illustrated, the button 210A may be selected by a user of the content-sharing platform 130 to indicate that the user approves or likes the media item 206. Button 210B may be selected by a user to indicate that the user disapproves or dislikes the media item 206. Other buttons and interface elements may be included in other embodiments of the media viewing portion 202.

The user interface 200 also includes a frictionless sharing portion 220. By "frictionless," it is meant that the effort as determined by a number and/or complexity of user interactions required to share a media item is minimized, such that with a single action, or only a few actions, a user may share a media item with one or more of the user's contacts. In the illustrated embodiment of FIG. 2, the frictionless sharing portion 220 include a text-based description 222 informing the user that the user can share the media item 206 with one or more friends or contacts by selecting one or more of corresponding interface elements 224A-F. The text-based description 222 may not be present in some embodiments. As shown, the frictionless sharing portion 220 includes six interface elements 224A-F corresponding to six contacts of the user who are logged into and interacting with the content-sharing platform 130 through the user interface 200. Other embodiments may include more or fewer interface elements 224A-F. For example, if a user only has two contacts associated with the user's account in the account data 138 in the account service 136 of the content-sharing platform 130, the frictionless sharing portion 220 may include two interface elements 224A and 224B. Where the user has more contacts than may be displayed effectively in the frictionless sharing portion 220, the content-sharing platform 130 may determine which of the user's contacts should have corresponding interface elements 224 displayed.

Each of the interface elements 224A-F may be a visual representation of the contact corresponding to each of the interface elements. In some embodiments, the visual representation may be a name or a username. In other embodiments, the visual representation is a photograph or another digital image in the likeness of the contact. The visual representation may be a profile image used by the contact on the content-sharing platform 130. In some embodiments, the visual representation is provided by a photo in which the contact has been tagged, which may be a photo including the contact and others. Additionally, a tooltip associated with an interface element may appear when a user places a cursor over the interface element. In some embodiments, the tooltip may include a name of the contact associated with the interface element. As is described herein in more detail, by selecting one of the interface elements 224A-F, the user may request that the media item 206 be shared by the content-sharing platform 130 with the contact of the user that corresponds to (e.g., is depicted in) the selected element of the interface elements 224A-F. After a user has selected one of the interface elements 224A-F (for example, interface element 224D), an indicator 226 may appear in the user interface 200 to indicate that the user has requested to share the media item 206 with the contact associated with the interface element 224D. In some embodiments, the user may be able to select more than one of the interface elements 224A-F, in which case an indicator 226 may be displayed in connection with each of the selected interface elements. In some embodiments, a single messaging session may be initiated for all of the contacts associated with the selected interface element. All of the selected contacts may be participants in the messaging session.

The user interface 200 may further include a network sharing portion 230. The network sharing portion 230 may enable the user to share content with other users of a specific social network. This may be done by selecting one of the sharing network buttons 232. Each of the sharing network buttons 232 may represent a network or other mechanism by which a user may share the media item 206. For example, the user may select the button 1 of the sharing network buttons 232. The user may then be presented with a pop-up or other dialog box request that the user enter credentials to be able to share the media item 206 on the network or service corresponding to the button 1. For example, the button 1 may be associated with a social network, such that by selecting the button 1 and entering credentials for the social network the user may share the media item 206 or a reference thereto as a post to the social network. The recipients of the post may be determined by the social network. For example, the followers of the user in that social network may receive a link to the media item 206, or the media item 206 may be included in their feeds.

The network sharing portion 230 may further include a link 234 that identifies the media item 206 by a uniform resource locator (URL) or address at which the media item 206 is made accessible by the content-sharing platform 130. To use the link 234, the user may manually select the link 234, manually copy the link 234, and paste the link 234 in another application running on a client device, such as one of client devices 110A-N. For example, a user may share the media item 206 by copying and pasting the link 234 into an email and then sending the email including the link 234 to a contact.

As opposed to the network sharing 230, frictionless sharing 220 provides for sharing with specific contacts that may or may not be users of a certain social network and provides for sharing with those specific contacts or with specific groups of contacts with minimal effort on the part of the user.

The user interface 200 may further include a comments area 240, an advertisement area 250, and a feed list 260. The comments area 240 may permit the user to comment on the media item 206 and to view comments of other users of the content-sharing platform 140 made in connection with the media item 206. The advertisement 250 may be an advertisement provided by an advertisement server 200. The feed list 260 includes feed items, like the exemplary feed item 262. As shown in FIG. 2, the feed item 262 includes a depiction of a media item and attributes of the media item. The depiction may be a thumbnail image of a portion of the media item and the attributes may include a title, a creator, a duration, and/or other information. In some embodiments, the feed list 260 may include media items shared with the user by other users of the content-sharing platform 130.

Figure 3:
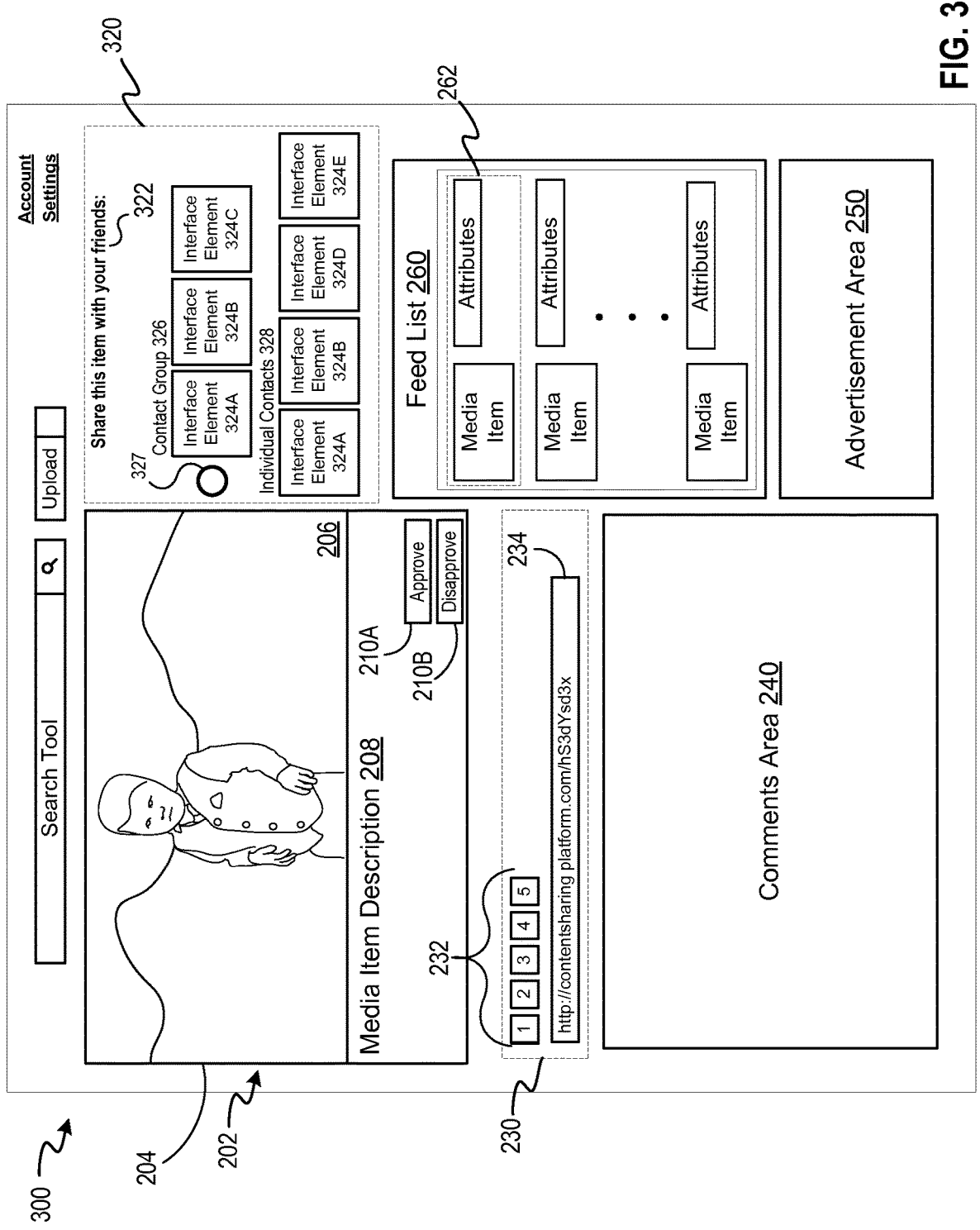
FIG. 3 illustrates another exemplary user interface for sharing a media item with one or more contacts, in accordance with some embodiments of the disclosure.

FIG. 3 illustrates another exemplary user interface 300 for sharing a media item with a contact, in accordance with some embodiments of the disclosure. The user interface 300 may share many of the features described above in connection with the user interface 200 of the FIG. 2. For simplicity of explanation, the same reference numbers may be used to refer to the features and portions of the user interface 300 as are used in connection with FIG. 2. Thus, the user interface 300 includes a media viewing portion 202 that includes a media player 204 to display a media item 206. The media viewing portion 202 also includes a media item description 208 as described above, which may further include interaction buttons 210A and 210B.

In the illustrated embodiment, the user interface 300 further includes the conventional sharing portion 230, the comments area 240, the advertisement area 250, and the feed list 260. As shown in FIG. 3, a frictionless sharing portion 320 is included above the feed list 260 in the layout of the user interface 300. The frictionless sharing portion 320 includes text-based description 322 to communicate to the user that the user may share the media item with friends using interface elements 324A-E. In some embodiments, the size of the interface elements 224A-D may be dynamically adjusted to include more or fewer interface elements corresponding to contacts of the user. As shown in FIG. 3, the interface elements 324A-E are distributed in a contact group 326 and as individual contacts 328. By selecting on the radio button 327 (or another functionally-equivalent interface feature), the user may request to share the media item 206 with the three contacts corresponding to the interface elements 324A, 324B, and 324C. Contact groups may be generated by the content-sharing platform 130 or manually selected by the user. The individual contacts 328 include interface elements 324A, 324B, 324D, and 324E and by selecting any, some, or all of the interface elements 324A, 324B, 324D and 324E, the user may automatically share the media item 324A with the contact corresponding to the selected interface element or elements.

As discussed, not all of a user's contacts may be displayed in interface elements in the frictionless sharing portion 320. For example, a user may have more than one hundred contacts, and the user interface 200 may not be able to display one hundred interface elements, even though interface elements may be dynamically resized to provide for room. The interface elements may become too small to display properly in such an event. Accordingly, the content-sharing platform 130 may review the account data 138 associated with the user. This account data 138 may include a list of the user's contacts as well as information about their interactions. For example, the account data 138 may indicate that when the user shares a media item with two specific contacts, the user usually includes a third contact. As seen in FIG. 3, the contacts corresponding to interface elements 324A, 324B, and 324C may be identified by the content-sharing platform 130 as contacts with which the user is likely to share as a group. Similarly, the individual contact 328 may include those contacts with which the user is most likely to share media items. In some embodiments, the contacts with corresponding interface elements in the individual contacts 328 may be those contacts with whom the user is most likely to share the media item 206, specifically. The content-sharing platform 130 may use information contained in the media item description 208 to determine which contacts should be presented to the user. For example, the content-sharing platform 130 may identify a pattern that when the media item description 208 indicates that the user is the creator, owner, or uploader, the user is most likely to share with a first contact, then next most likely to share with a second contact, etc. The interface element 324A may then correspond to the first contact, the interface element 324B, may correspond to the second contact, etc.

Referring now to FIG. 4, populating the frictionless sharing portion 320 with interface elements 324A-E corresponding to appropriate contacts may be done in a variety in ways. FIG. 4 is a flow diagram of a method 400 for selecting contacts to include in the frictionless sharing portion 320, in accordance with some aspects of the present disclosure. The method 400, and other methods described herein, may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the method 400 and other methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program, including a set of instructions, accessible from any non-transitory, tangible computer-readable device or storage medium. In one embodiment, method 400 may be performed by the content-sharing platform 130 and subsystems thereof as shown in FIG. 1.

Embodiments of the method 400 may begin at block 402 in which processing logic identifies a plurality of contacts of a user. For example, the content-sharing platform 130 may search account data 138 for user items associated with the user, including a list of contacts of the user. Block 402 may be performed in response to a user request to view a media item or periodically for each user.

At block 404, the processing logic may calculate a sharing strength metric between the user and each of the contacts. The sharing strength metric may indicate how likely a user is to share a media item (any media item or a particular media item requested to be viewed) with a given contact. The content-sharing platform may select a sharing strength metric and include a number of contacts having a sharing strength metric above a certain threshold. The threshold may be determined by judging all of the contacts of the user by the sharing strength metric and presenting the top scoring contacts in the available interface elements of the frictionless sharing platform. The sharing strength metric may use a variety of factors to indicate how likely the user is to share a media item with a contact. Thus, the sharing strength metrics for each of the contacts may change depending on the media item to be shared. Factors that may be included in the determination of the sharing strength metric may include presence on the content-sharing platform 130 (e.g., whether the contact is signed-into and active on the content-sharing platform 130 or a messaging service associated with the content-sharing platform 130), a count of previous shares between the user and the contact (shares from and share to the contact may be counted together or separately), and shared interactions. In some embodiments, private information such as a consumption history may be excluded from the information user to calculate the sharing strength metric. Thus, in some embodiments, only publically available information (e.g., approvals, comments, etc.) may be used in determining the sharing strength metric.

For example, shared interactions may include information showing that both the contact and the user approved of the requested media item or any other media item, whether they both subscribe to a channel that includes the requested or other media item, whether they have both viewed the requested or other media item, whether they have both commented on the requested or other media item, etc. In some instances, having both viewed the requested media item may decrease the sharing strength metric, because both have already viewed the requested media item. In other instances, this may indicate that the user and the contact may be likely to engage in a conversation, such as by a messaging service, regarding the requested media item. In some embodiments, a physical location of the user and a physical location of the contact may be used, such that with increasing proximity, the sharing strength metric may increase.

At block 406, each of the contacts is ranked by the processing logic according to the sharing strength metric of the contact. For example, the content-sharing platform 130 may generate a list of the user's contact and order contacts in the list in order of sharing strength metric from highest to lowest. At block 408, the processing logic causes a first subset of the plurality of contacts to be provided for presentation to the user (e.g., as part of a web page or another user interface document to be rendered on the user device). A second subset of the plurality of contact, a subset having lower sharing strength metrics, may not be provided for presentation to the user. The quantity of the first subset of contacts may be determined by the area available in the user interface 200 or 300 for the friction sharing portion 220 or 320, respectively. Thus, if the area available increases or the size of the interface elements 224A-F or 324A-E decreases, more contact may be in the first subset. The number of contacts in the first subset may also be based on a size of each interface element.

Figure 5A:
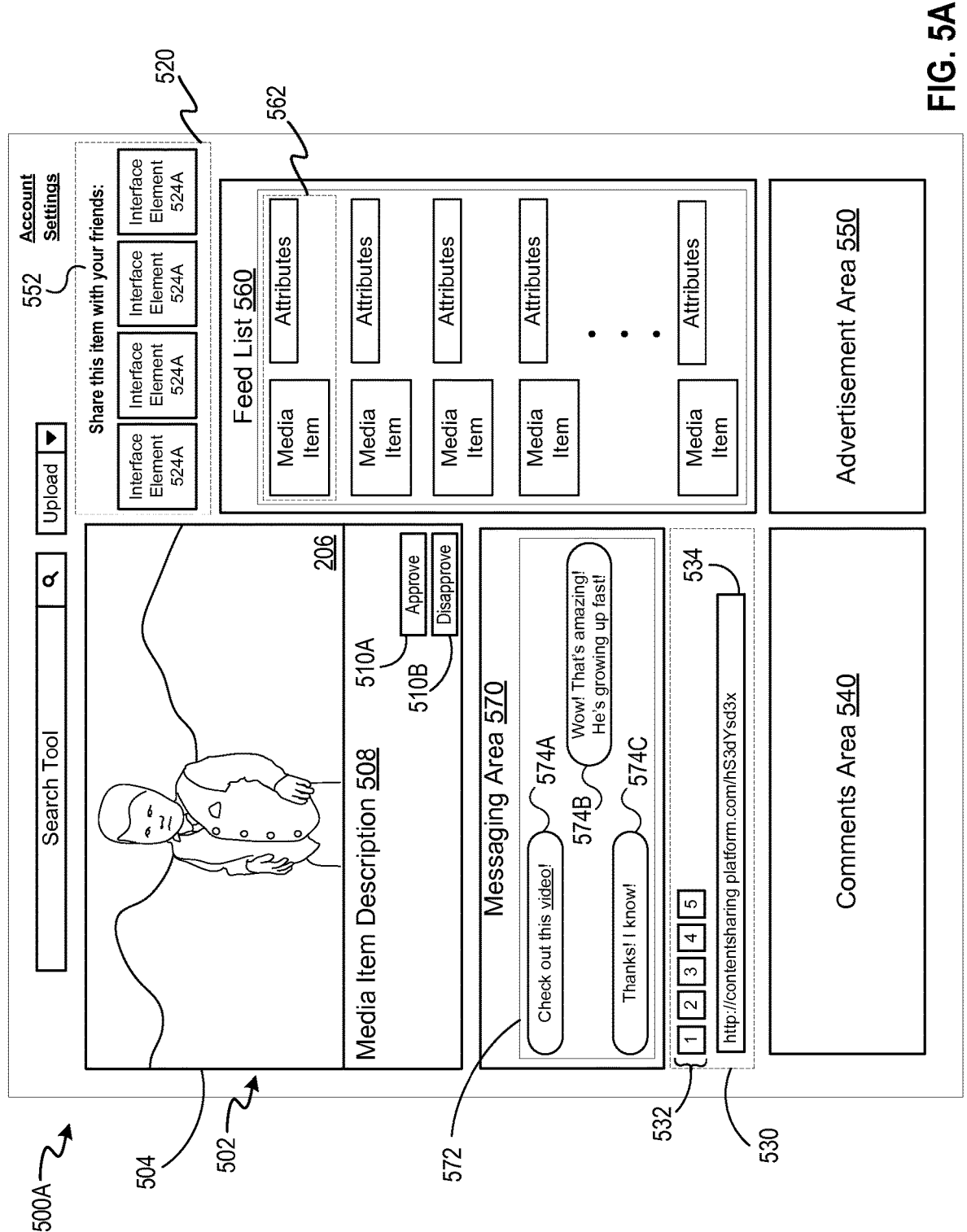
FIG. 5A illustrates an exemplary user interface for presenting a shared media item to a contact of a user, in accordance with some embodiments of the disclosure.
Figure 5B:
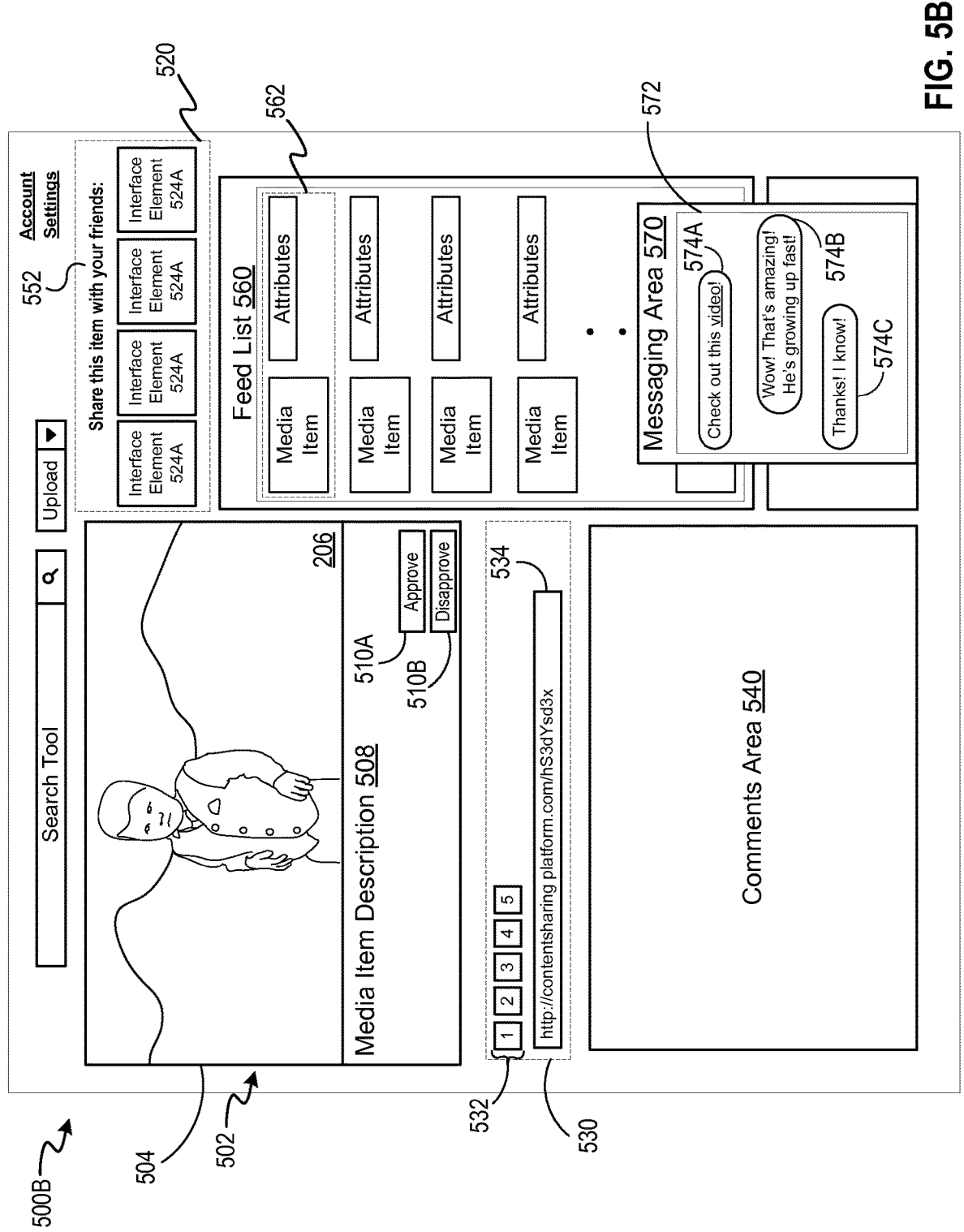
FIG. 5B illustrates another exemplary user interface for presenting a shared media item to a contact of a user, in accordance with some embodiments of the disclosure.

FIG. 5A illustrates an exemplary user interface 500A for presenting a shared media item to a contact of a user of the content-sharing platform 130 in accordance with some embodiments of the disclosure. As described herein, a user may share a media item with a contact by selecting an interface element corresponding to that contact. FIGS. 5A and 5B illustrate a user interface as seen and used by the contact to view the shared media item. Thus, the user interface includes many of the elements and features described above in connection with user interfaces 200 and 300. Thus, the user interface 300 includes a media viewing portion 502 that includes a media player 504 that is shown as displaying the media item 206, which the user shared with the contact earlier by selecting one of the interface elements corresponding to the contact. The media viewing portion 502 also include a media item description 508 as described above and interaction buttons 510A and 510B.

The user interface 500A further includes a frictionless sharing portion 520, a network sharing portion 530, a comments area 540, an advertisement area 550, and a feed list 560. As shown in FIG. 5A, the user interface 500A further includes a messaging area 570. The messaging area 570 may be provided by the messaging service 142 of the content-sharing platform of FIG. 1 or it may be provided by the messaging service 160, which may be a third-party service or a co-operated service, external to the content-sharing platform 130. When the user shares the media item 206 with the contact, by selecting the corresponding interface element (for example, the interface element may be the interface element 324A of FIG. 3), the media item 206 may be displayed to the contact in the media player 504. A popup, alert, or notification may be displayed to the contact, prior to playing the media item 206, to provide options to the contact. For example, the contact may be able to choose to play the media item 206 immediately, add the media item 206 to the contact's watch list, or ignore the shared media item 206.

As described herein, when the user shares the media item 206 with the contact, the user may simultaneously initiate a messaging session between the user and the contact. Thus, in the user interface 500A presented to the contact, the messaging area 570 may appear or may begin displaying a messaging session 572 between the user and the contact when the media item 206 is shared. As shown in FIG. 5A, the messaging session 572 includes several messages. The message 574A may be an initiating message, such that it may be the first message in the messaging session, in some embodiments. The message 574A includes a reference to the media item 206. For example, the message 574A may include a link to the media item 206. In some embodiments, the message 574A may include a thumbnail of the media item 206 in addition to text. The message 574A may be automatically generated by the content-sharing platform 130 in response to the user's selection of the interface element corresponding to the contact in UI 200 or UI 300. In some embodiments, no other action was required of the user to share the media item.

After the media item 206 is shared with the contact and the messaging session 572 is initiated, and the message 574A is sent to the contact in the messaging session, the user and the contact may use the messaging session 572 to exchange text-based messages. Additionally, the contact may use the user interface 500A to navigate to and view other media items of the content-sharing platform 130 in the media player 504. The contact may select an interface element 524A, corresponding to the user, in the frictionless sharing portion 520 to share a second media item currently being viewed in the media player 504 by the contact. A message like the message 574A may then be sent in the messaging session 572 to the user. In other embodiments, the sharing of the current media item by the contact may generate another messaging session, displayed in the messaging area 570. Generating a new messaging session for each new media item shared may enable participants (e.g., the user, the contact, additional contacts, and/or other participants) to focus conversation on a particular media item. The messaging area 570 may include a tabbed view, such that users of the content-sharing platform 130 may select among a plurality of ongoing messaging sessions.

In some embodiments, the contact may share the media item 206 with another contact by selecting a corresponding interface element 524B. The contact may choose a default behavior such that when a media item is being consumed (e.g., media item 206) and the media item is present in an ongoing messaging session (e.g., messaging session 572), the media item is shared with the other contact and the other contact is added into the messaging session 572, such that the messaging session 572 has more than two participants. In adding the other contact to the messaging session 572, which is an ongoing messaging session between the user and the contact, a reference to the media item 206 may be shared again in the messaging session 572. For example, the message 574A may be repeated each time a participant is added to the messaging session 572. In this way, each added participant (whether added by the user or by the contact) may receive the media item 206, which was the original media item shared to initiate the messaging session 572. In some embodiments, the repeated message 574A may be displayed to the participant being added but not to participants of the messaging session 572 that were already in the messaging session 572. In some embodiments, additional messages may be sent to the added participate, to enable the added participant to "catch up" with the conversation of the messaging session 572. The added participant may be in a contact list of the contact, but not in the contact list of the user that originally shared the media item 206 with the contact. In other embodiments, only mutual contacts may be added to an ongoing messaging session, like the messaging session 572.

FIG. 5B illustrates an exemplary user interface 500B that includes at least some of the features and portions of the user interface 500A. In the user interface 500B, the messaging area 570B is a dynamic portion of the user interface 500B, such that it may appear over other portions of the user interface 500A when the messaging session 572 is initiated by the sharing of the media item 206 in one of the user interface 200 or 300 of FIG. 2 or 3, respectively. The messaging area 570B may be collapsible and restorable, such that it may be "removed" from over the bottom portion of the feed list 560 and the advertisement area 550 and then displayed again without terminating the messaging session 572 or losing any of the messages 574A-C. Additional messages may be added to the messaging session 572, even when in a collapsed state. The additional messages may be viewed upon restoring the messaging area 570B. The messaging area 570B may be provided by an HTML iframe.

The user interfaces 200, 300, 500A, and 500B, may be provided by the content-sharing platform 130 and may allow users to share a media item with a contact by selecting an interface element depicting that contact. In some embodiments, no other action may be required to share the media item. Additionally, the user interfaces 500A and 500B illustrate how messaging sessions may be initiated simultaneously with the sharing of the media item to allow the user and the contact (and subsequently added participants) to exchange messages about the shared media item.

Figure 6:
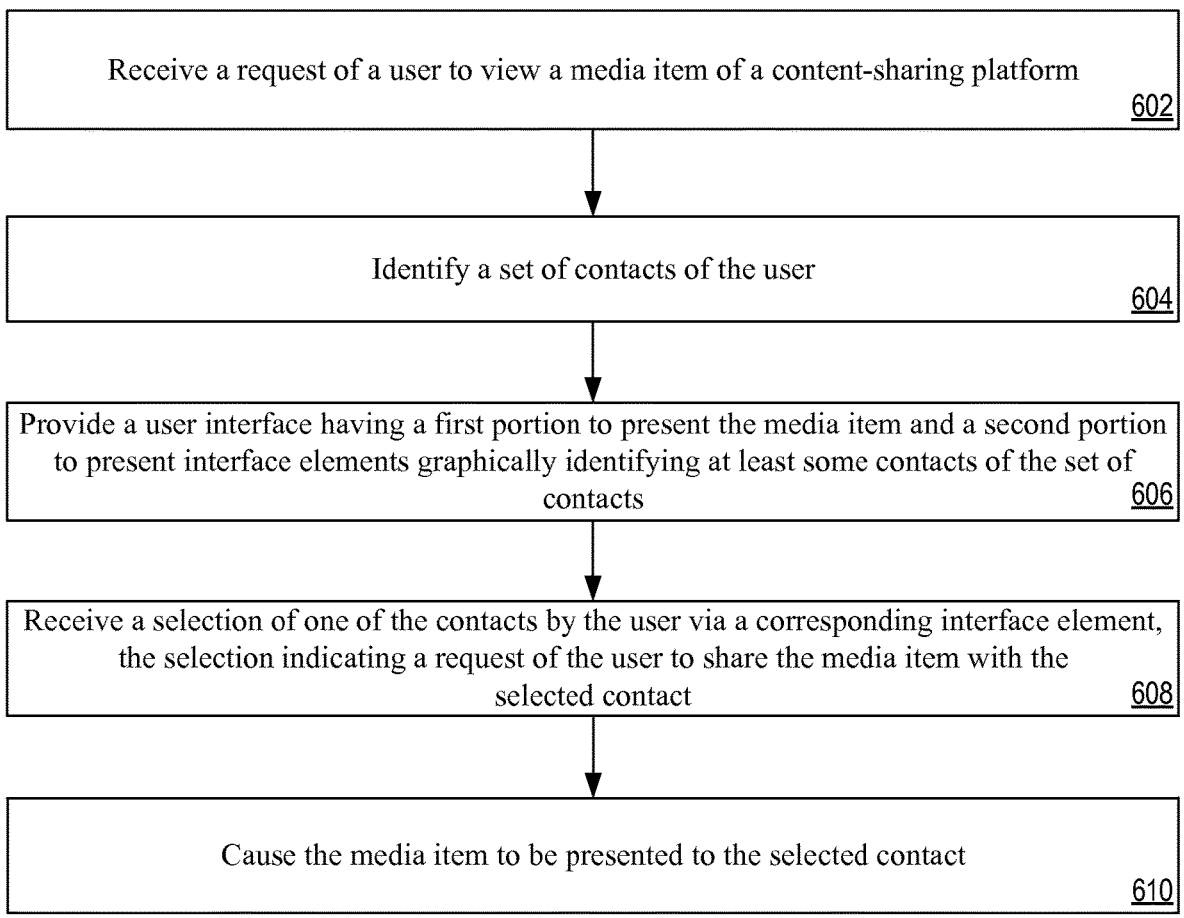
FIG. 6 is a flow diagram illustrating a method for sharing a media item with a contact in a content-sharing platform, according to some embodiments of the disclosure.

FIG. 6 is a flow diagram of a method 600 for sharing a media item with a contact in a content-sharing platform, like the content-sharing platform 130 of FIG. 1, in accordance with some implementations. The method 600 may enable a user to share a media item with a specific contact or group of contacts with as little as single click or tap. At block 602, processing logic receives a request of a user to view a media item of a content-sharing platform. For example, the user may request to view the media item 206 of FIGS. 2, 3, 5A, and 5B. The user may select the media item 206 from a list of media items to request to view in the media player 204.

At block 604, a set of contacts of the user may be identified by the processing logic. This may be done by querying the account service 136 of the content-sharing platform 130 as seen in FIG. 1. The account server 136 includes account data 138 storing user items 140A-N, at least some of which is associated with the user. One or more of the user items 140A-N may include a list of the user's contacts. At block 604, the processing logic provides a user interface having a first portion to present the media item and a second portion to present one or more interface elements graphically identifying at least some contact of the set of contacts. For example, the content-sharing platform 130 may provide the user interface 200 or the user interface 300. The user interfaces 200 and 300 both include a media viewing portion 202 and 302, respectively, presenting the media item 206 and a frictionless sharing portion 220 and 320, respectively. The frictionless sharing portion 320 includes interface elements 324A-F. The interface elements 324A-F may display photos or profile images of corresponding contacts identified at block 604. In some embodiments, a subset of the identified contacts of the user may be displayed in the frictionless sharing portion 320, rather than all of the identified set of contacts. In some embodiments, the subset may be determined as shown in FIG. 4 and described herein.

At block 608, the processing logic receives a selection of one or the contacts by the user via the corresponding interface element. The selection indicates a request of the user to share the media item with the selected contact. For example, the user may request to share the media item 206 while it is being presented in the media player 204 by selecting the interface element 224A. The content-sharing platform 130 may communicate with the contact to indicate that the user has shared the media item 206 with the contact. At block 610, the processing logic causes the media item to be presented to the selected contact. For example, the contact may view the media item in a user interface like the user interfaces 500A and 500B as seen in FIGS. 5A and 5B, respectively, and described herein. Thus, the media item may be shared in a messaging session initiated in response to the request from the user to share the media item 206 with the contact. This may be better understood by reference to FIG. 7.

Figure 7:
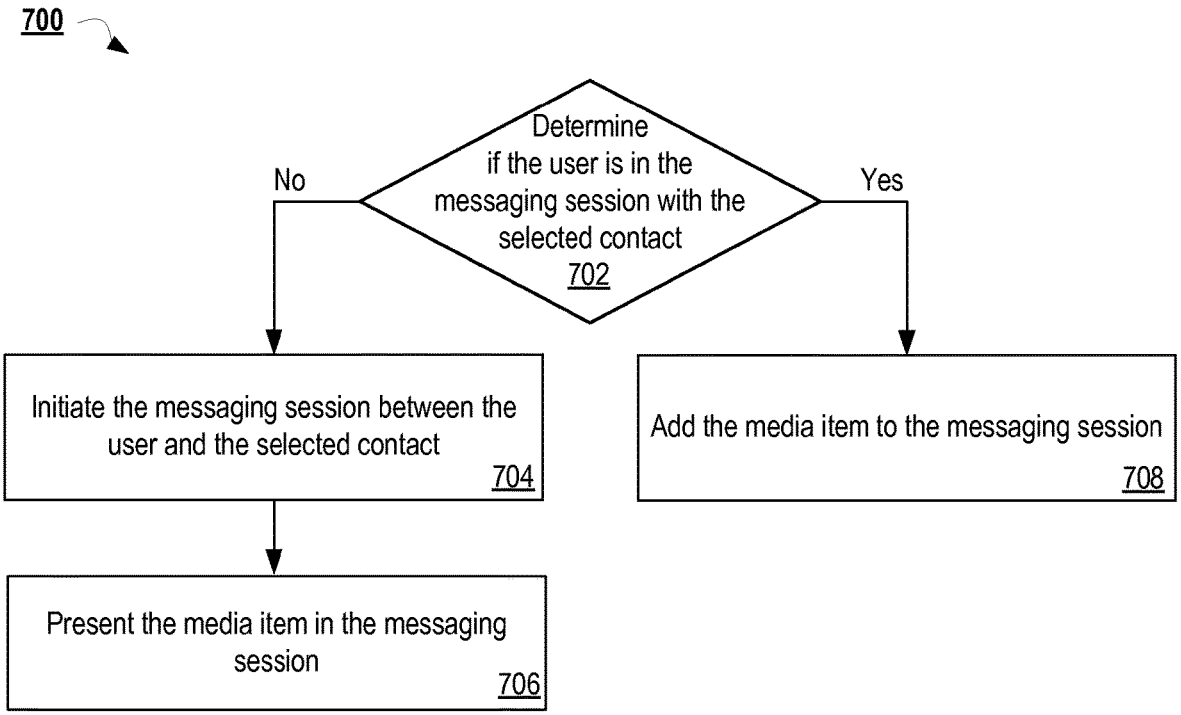
FIG. 7 is a flow diagram illustrating a method of sharing a media item hosted by a content-sharing platform according to some embodiments of the disclosure.

FIG. 7 is a flow diagram of a method 700 of sharing a media item hosted by a content-sharing platform, in accordance with some implementations. At block 702, processing logic may determine whether a user requesting to share a media item with a contact is in a messaging session with the selected contact. The processing logic may make this determination upon receiving a selection of an interface element corresponding to the contact. For example, when the user selects the interface element 224A of FIG. 2, the content-sharing platform 130 may query the messaging service 142, running thereon, to determine whether the user and the contact are in a messaging session. If the user is not in a messaging session with the selected contact, the method may proceed to block 704, at which the processing logic initiates a messaging session between the user and the selected contact. The processing logic may present the media item in the messaging session at block 706. This may be done by including a link to the media item or by presenting a media player 504 in-line in the messaging session. If the user is already in a messaging session with the selected contact, the method 700 may continue on to block 708 at which the media item is added to the messaging session. As described, this may be done by including a link or other reference to the media item in the messaging session, or by including the media item itself in the messaging session.

Figure 8:
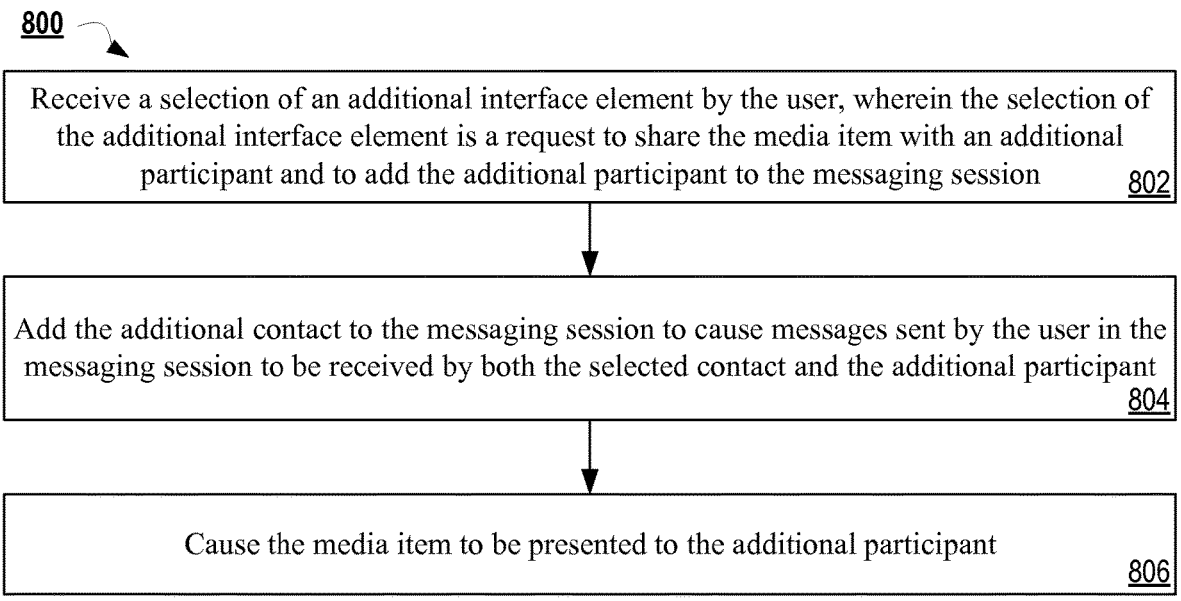
FIG. 8 is a flow diagram illustrating of adding an additional participant into a messaging session including a media item, according to some embodiments of the disclosure.

FIG. 8 is a flow diagram of a method 800 of adding an additional contact into a messaging session, in accordance with some implementations. The method 800 may begin at block 802, in which processing logic receives a selection of an additional interface element by the user, wherein the selection of the additional interface element is a request to share the media item with an additional contact and to add the additional contact to the messaging session. An example may be found in the description of the user interfaces 500A and 500B of FIGS. 5A and 5B, respectively. When the user has shared a media item with a contact, and a messaging session is ongoing, the user or the contact may request to add an additional participant to the messaging session and to share the media item with the additional participant by selecting an interface element, such as the interface element 524B of FIGS. 5A and 5B, which corresponds to the additional participant or contact. At block 804, the processing logic adds the additional participant to the messaging session and cause messages sent by the user in the messaging session to be receive by both the selected contact and the additional participant. The processing logic may additionally cause messages sent by the user to the selected contact before the addition of the additional contact to the messaging session to be sent to the additional participant. For example, the message 524A may be sent again to the additional participant to enable the additional participant to receive a link to the media item being shared. At block 806, the processing logic may cause the media item to be presented to the additional participant. This may be performed by the content-sharing platform 130, to which the additional participant is signed-in, in a user interface with a media player.

Figure 9:
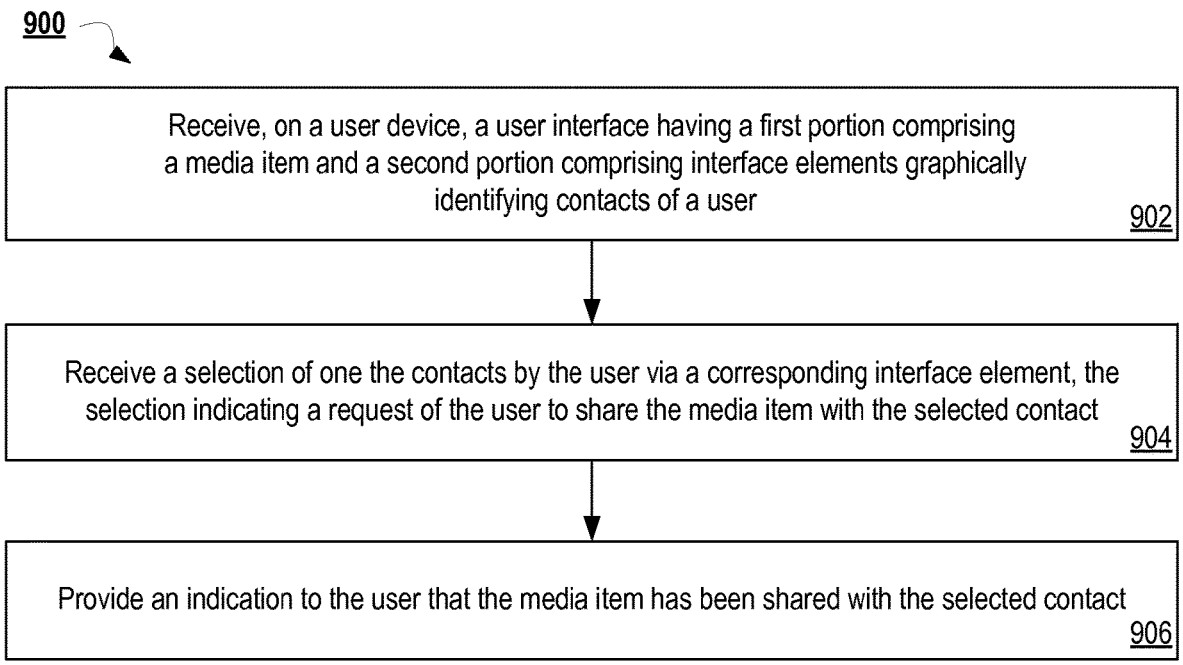
FIG. 9 is a flow diagram illustrating a method of sharing a media item hosted by a content-sharing platform, according to some embodiments of the disclosure.

FIG. 9 is a flow diagram of a method 900 for sharing a media item presented on a user device, in accordance with some implementations. At block 902, the processing logic receives a user interface having a first portion comprising a media item and a second portion comprising interface elements graphically identifying contacts of a user. In some embodiments, the processing logic may be provided by one of the client devices 110A-N of FIG. 1. For example, the client device 110A may be a smartphone that is in communication with the content-sharing platform 130 through the network 120. The content-sharing platform 130 may transmit data including a web page or another type of user interface document to the media viewer 112, which may be a browser or a mobile app operating on the client device 110A. At block 904, the processing logic may receive a selection of one of the contacts by the user via a corresponding interface element. The selection may indicate a request of the user to share the media item with the selected contact. For example, the client device 110A may receive a tap on a touch-screen on the interface element, which may display a photo the contact with which a user of the client device 110A wants to share the media item. At block 504, the processing logic provides an indication to the user that the media item has been shared with the selected contact. This may be done as shown in FIG. 5B. The indication may allow the user to be aware of which of a plurality of contacts the user is sharing media items with.

Figure 10:
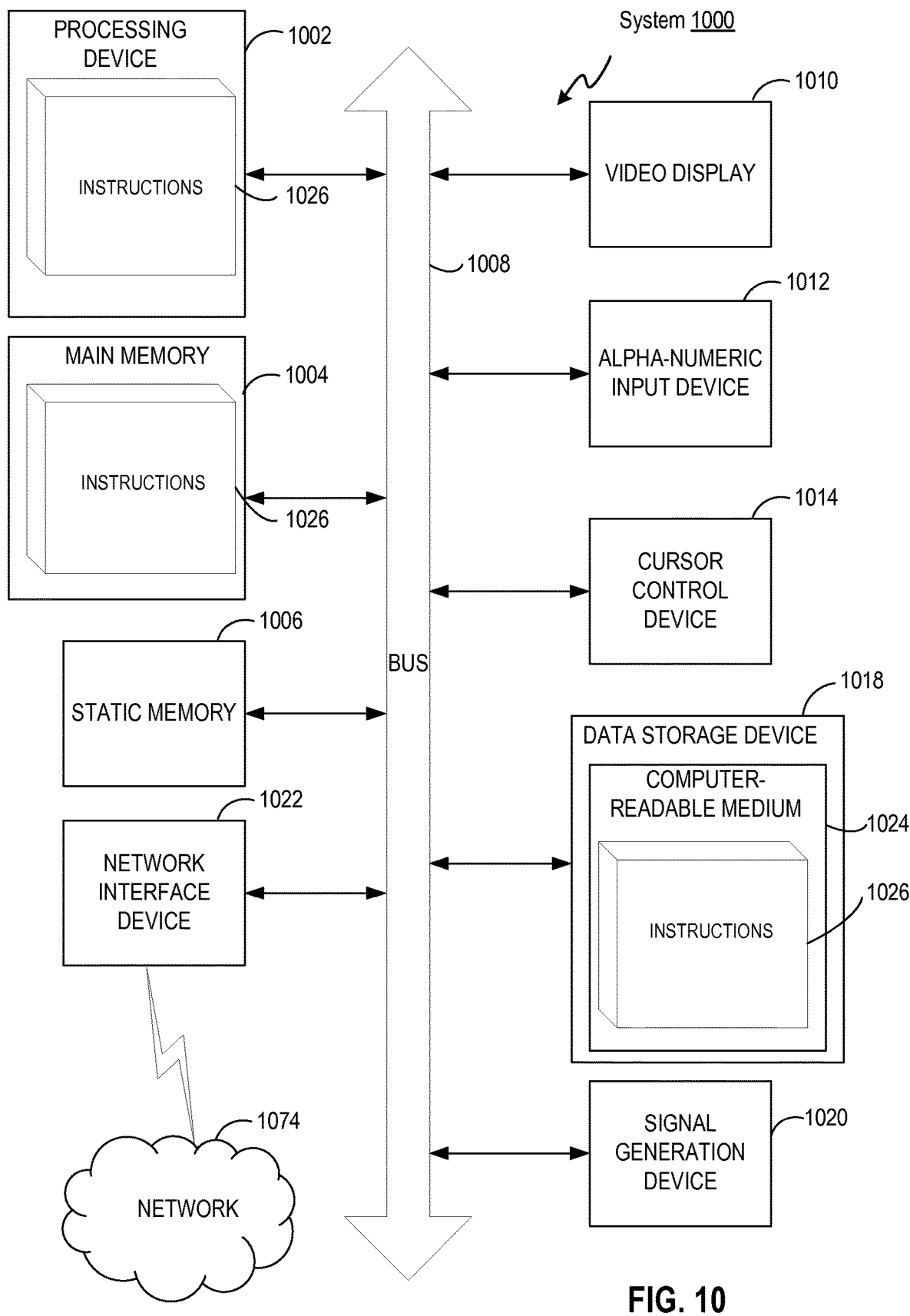
FIG. 10 is a block diagram illustrating an exemplary system architecture, according to some embodiments.

FIG. 10 illustrates a diagrammatic representation of a machine in the exemplary form of a computer system 1000 within which a set of instructions or sets of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing device (processor) 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1008.

Processor 1002 represents one or more general-purpose processing devices such as a microprocessor, central processing unit, or the like, having one or more cores. More particularly, the processor 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1002 may also be one or more special-purpose processing devices such as an application specific integrated circuit (ASIC), a field programmable gate array (FPGA), a digital signal processor (DSP), network processor, or the like. The processor 1002 is configured to execute instructions 1026 for performing the operations and steps discussed herein. For example, the processor 1002 may execute instructions 1026 to perform methods 400, 600, 700, 800, and 900 as shown herein in FIGS. 4, 6, 7, 8, and 9, to provide the content-sharing platform 130 of FIG. 1, and to provide the user interfaces 200, 300, 500A, and 500A of FIGS. 2, 3, 5A, and 5B.

The computer system 1000 may further include a network interface device 1022. The network device 1022 may include a plurality of network interface components, with each components being adapted for different modes of communication. For example, the network interface components may include an 802.11 transceiver, a Bluetooth® transceiver, and an interface for communicating with one or more cellular networks. The computer system 1000 also may include a video display unit 1010 (e.g., a liquid crystal display (LCD), a cathode ray tube (CRT), or a touch screen), an alphanumeric input device 1012 (e.g., a physical keyboard or a virtual keyboard), a cursor control device 1014 (e.g., a mouse or touch-screen sensor system), and a signal generation device 1020 (e.g., a speaker).

The data storage device 1018 may include a non-transitory computer-readable storage medium 1024 on which is stored one or more sets of instructions 1026 (e.g., software) embodying any one or more of the methodologies or functions described herein. The instructions 1026 may also reside, completely or at least partially, within the main memory 1004 and/or within the processor 1002 during execution thereof by the computer system 1000, the main memory 1004 and the processor 1002 also constituting computer-readable storage media. The instructions 1026 may further be transmitted or received over a network 1074 via the network interface device 1022.

In one embodiment, the instructions 1026 include instructions for a media providing a media item storage, a metadata service, a feed service, a feed service component, a media viewer or other features which may correspond, respectively, to identically-named counterparts described with respect to FIGS. 1, 2, and 3, and/or a software library containing methods for displaying content in between loops of a looping media item. While the computer-readable storage medium 1024 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In some embodiments, the computer system 1000 may be adapted more specifically to provide for a smartphone or a tablet device. FIGS. 11A-16 illustrated exemplary user interfaces such as may be used on these devices. However, the user interfaces illustrated herein may be presented on any type of user device.

Figure 11A:
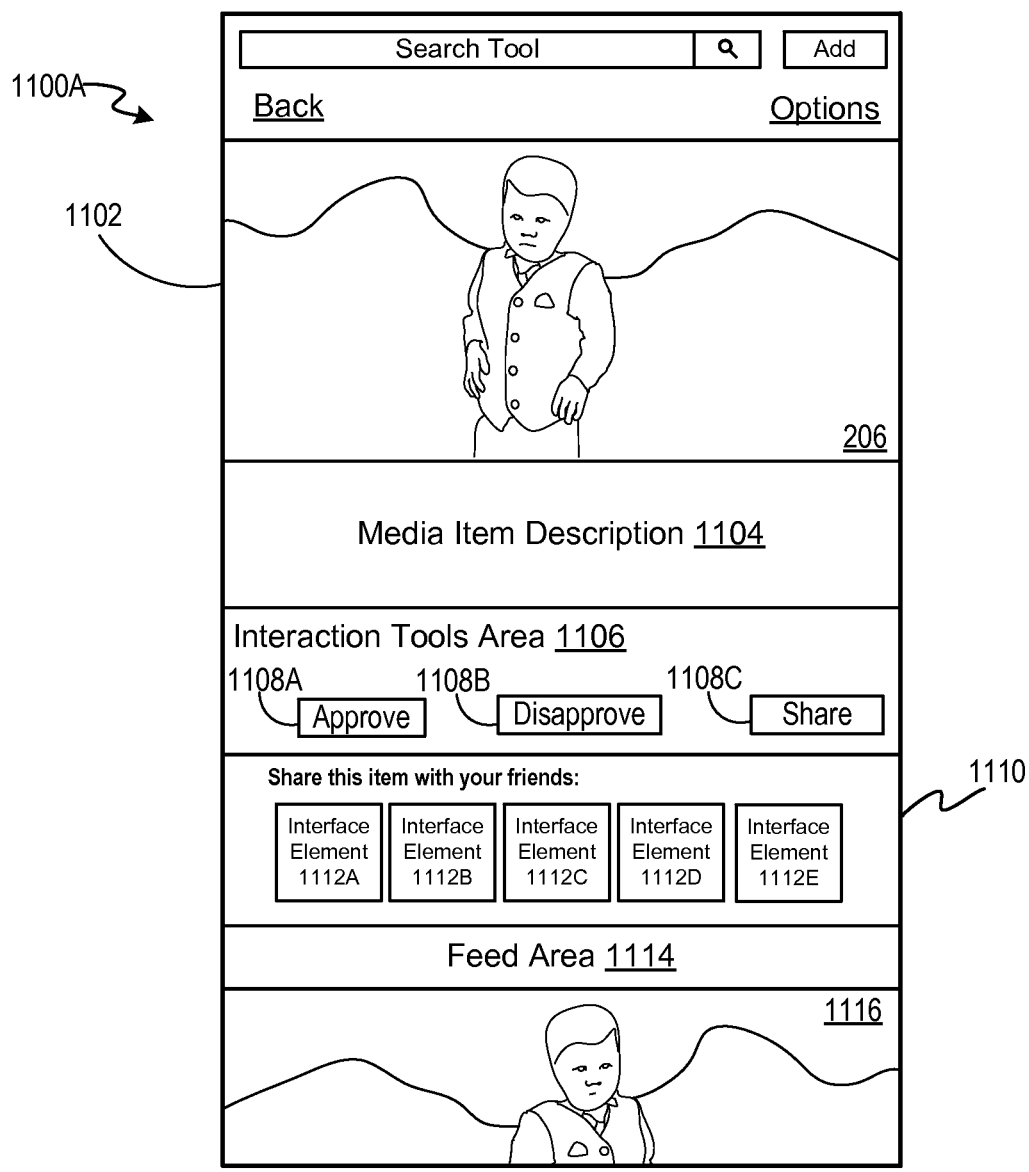
FIG. 11A illustrates an exemplary user interface for sharing a media item with one or more contacts, in accordance with some embodiments of the disclosure.
Figure 11B:
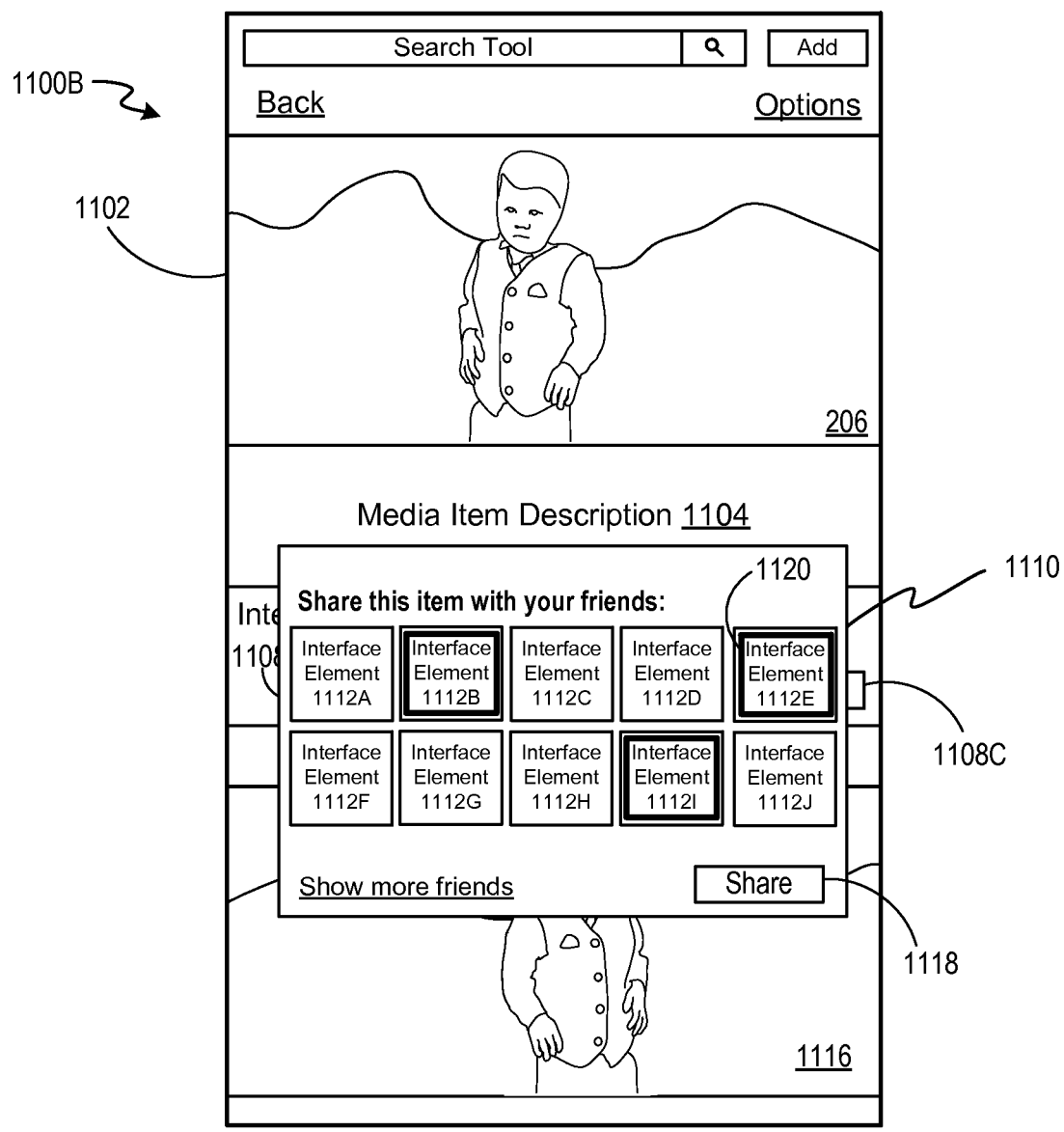
FIG. 11B illustrates another exemplary user interface for sharing a media item with one or more contacts, in accordance with some embodiments of the disclosure.

FIGS. 11A and 11B illustrate exemplary user interfaces for sharing a media item with one or more contacts, in accordance with some embodiments of the disclosure. FIG. 11A depicts a user interface 1100A include a media player portion 1102 in which the media item 206 is being presented. The media player portion 1102 may be present in a feed, such that the media player portion 1102 may be positioned on the screen, moved out of the screen, and/or moved into the screen by a scrolling action on the part of the user.

Proximate to the media player portion 1102 may be a media item description 1104, which may include information about the media item 206, such as an owner, a title, a duration, a date uploaded to the content-sharing platform 130, and interaction information, such as a number of views, a number of approvals, a numbers of disapprovals, etc. In some embodiments, the media item description 1104 may not be displayed by default. For example, the information may be displayed in a foreground of the media player portion 1102 prior to the presentation of the media item 206. The user interface 1100A may further include an interaction tools area 1106. The interactions tools area may provide many interface elements, buttons, dials, sliders, etc., by which a user by interact with the media item 206. The user may interact with the media item to approve of it by selecting the approve button 1108A, to disapprove of it by selecting the disapprove button 1108B, and/or share it by selecting the share button 1108C. In some embodiments, upon selecting the share button 1108C, the user may be presented in a display of the user device with a link to the media item 206 and/or a plurality of networks through which to share the media item 206.

The user interface 1100A further includes a frictionless sharing portion 1110, which includes several interface elements. By selecting one or more of the interface elements 1112A-E, the user may request to share the media item 206 with one or more contacts corresponding to the interface elements 1112A-E. In some embodiments, upon selection of one of the interface elements 1112A-E, the media item 206 may be automatically shared with the corresponding contact and messaging session may be automatically initiated between the user and the corresponding contact. The media item 206 may appear directly as a message in the messaging session and/or a reference to the media item 206, such a link, may be included as a message. In some embodiments, the whether the media item is included directly in the messaging session or as a reference in the messaging session may be determined by the system used by the contact to receive the shared media item.

Additionally, in some embodiments, one or more of the interface elements 1112A-E may be selected and a graphical indicator of the selection may be presented in connection with each selected interface element of the interface elements 1112A-E. After one or more interface elements 1112A-E are selected by the user, the user may then select the share button 1108C, the selection of which may be interpreted as a request to share the media item 206 with all of the selected interface elements 1112A-E.

Below of media player portion 1102, the media item description 1104, the interaction tools area 1106, and the frictionless sharing portion 1110, the user interface 1100A may include a feed area 1114. The feed area 1114 may include additional media items, such as the illustrated media item 1116. The media items in the feed area 1114 may be recommendations produced by the content-sharing platform 130 for the user of the device. In some embodiments, the user interface 1100A may include one or more dynamic portions such that one or more of the portions may appear and/or disappear depending on a position with the user interface 1100A. For example, if the user pushes the media item 206 out of the user interface 1100A by scrolling up or down, the media item description 1104, the interaction tools area 1106, and/or the frictionless sharing portion 1100 may disappear. Any other these portions may reappear in connection with the appearance of another media item, such that that other media may be described in a new media item description 1104, interacted with, and shared, etc.

FIG. 11B illustrates another exemplary user interface 1100B for sharing a media item with one or more contacts, in accordance with some embodiments of the disclosure. Features of the user interface 1100B having functions similar to features of the user interface 1100A of FIG. 11A may have the same reference numbers. Thus, the user interface includes 1100B includes a media player portion 1102, etc. In the user interface 1100B, when the user selects the share button 1108C, the frictionless sharing portion 1110 appears as a window or pop-up in a foreground of the user interface 1100B, such that may partially or wholly obscure the interaction tools area 1106 and/or the feed item area 1114. The frictionless sharing portion 1110 as shown in FIG. 11B may provide more area for the selection of contacts with which to share the media item 206 may the selection of corresponding interface elements 1112A-J. As shown in FIG. 11B, the user has selected interface elements 1112B, 1112E, and 1112I to request that the media item 206 be shared with contacts corresponding to each of these interface elements 1112B, 1112E, and 1112I. The user may select several contacts by selecting several of the interface elements 1112A-J and then select the second share button 1118. As shown in FIG. 11B, when the user selects one or more of the interface elements 1112A-J, a selection indicator 1120 may be presented in connection with the selected elements of elements 1112A-J.

Figure 12:
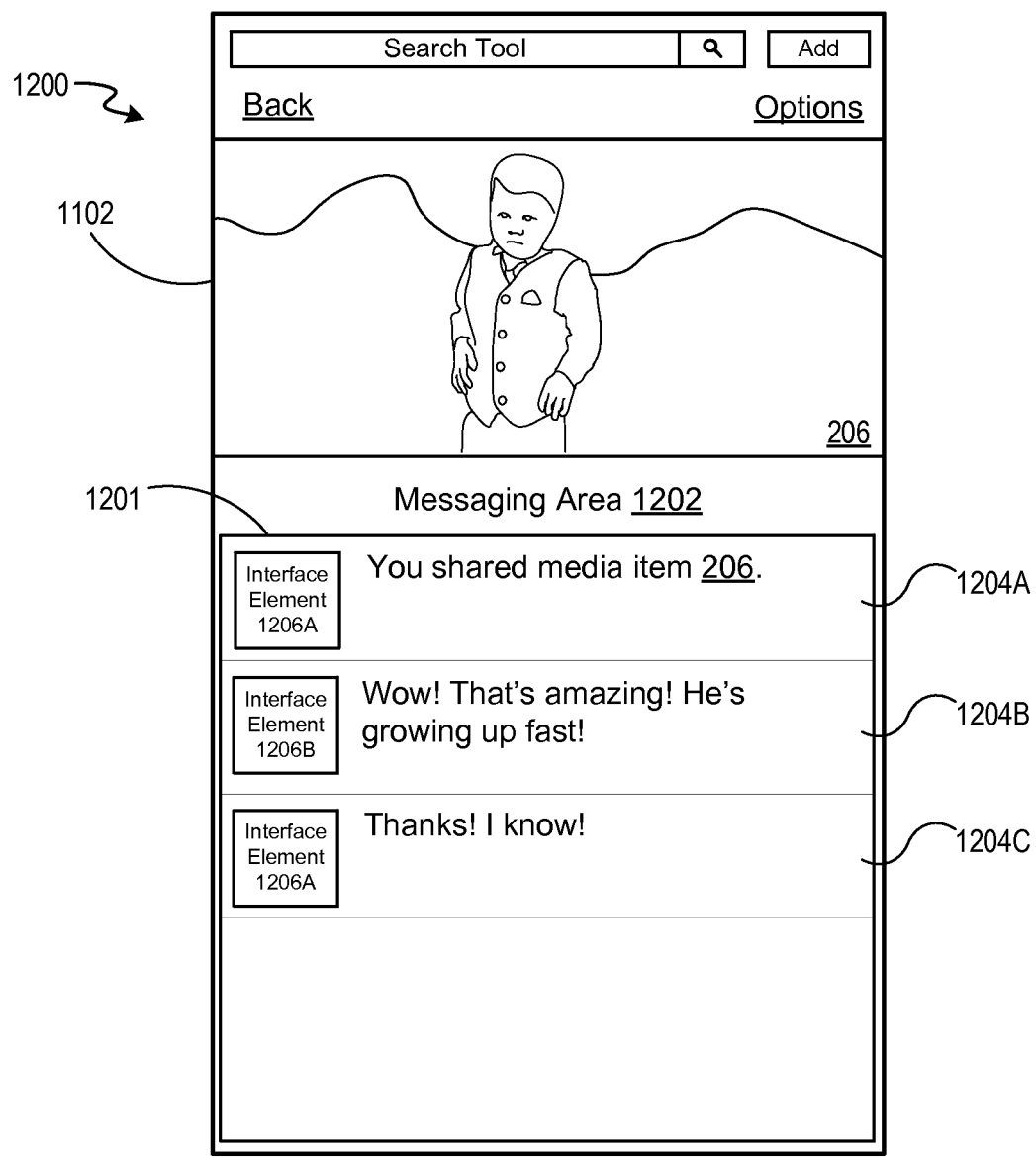
FIG. 12 illustrates an exemplary user interface for sharing a media item with one or more contacts in a messaging session, in accordance with some embodiments of the disclosure.

Referring now to FIG. 12, upon the selection of a contact with which to share a media item, the media item may be shared in a messaging session. FIG. 12 illustrates an exemplary user interface 1200, according to some aspects of the present disclosure. After the user shares the media item 206 with one or more contacts by selecting the one or more of interface elements 1112A-F of FIG. 11A or interface elements 1112A-J of FIG. 11B, a messaging session 1201 is initiated and presented in a messaging area 1202 of the user interface 1200. In some embodiments, the user may see an initiated message 1204A that indicates the media item that was shared, i.e. media item 206, to initiate the messaging session 1201. Thus, in the messaging area 1202, messages from the user as displayed in connection with the interface element 1206A. The interface element 1206A may be a photo or other image representing or depicted the user. A responsive message 1204B is illustrated as being received in the messaging session 1201 from a contact corresponding to the interface element 1206B. The user responds to the message 1204B by sending the message 1204C. In this way, the user interface 1200 may facilitate the user in having a conversation on the media item 206 by sharing the media item 206 with one or more contacts.

Figure 13:
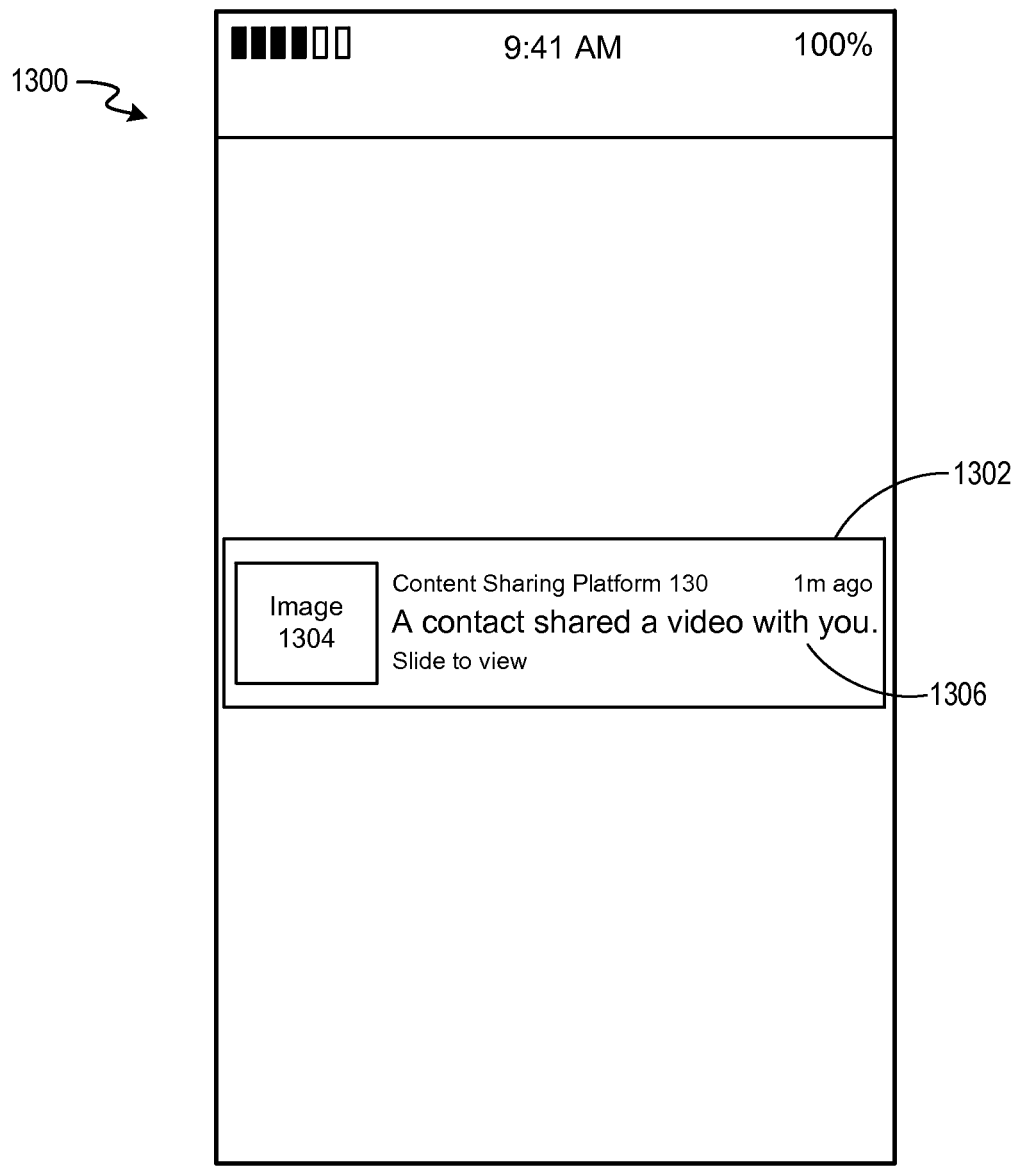
FIG. 13 illustrates an exemplary user interface for receiving a notification of a shared media item, in accordance with some embodiments of the present disclosure.

FIG. 13 illustrates an exemplary user interface 1300 such as may appear on a lock-screen or notification screen of a mobile device such as a tablet or smartphone, according to some aspects of the present disclosure. As shown the user interface 1300, a notification 1302 is displayed. The notification 1302 may be provided by the notification system 148 or the notification service 170 as seen in FIG. 1 and described herein.

Figure 14:
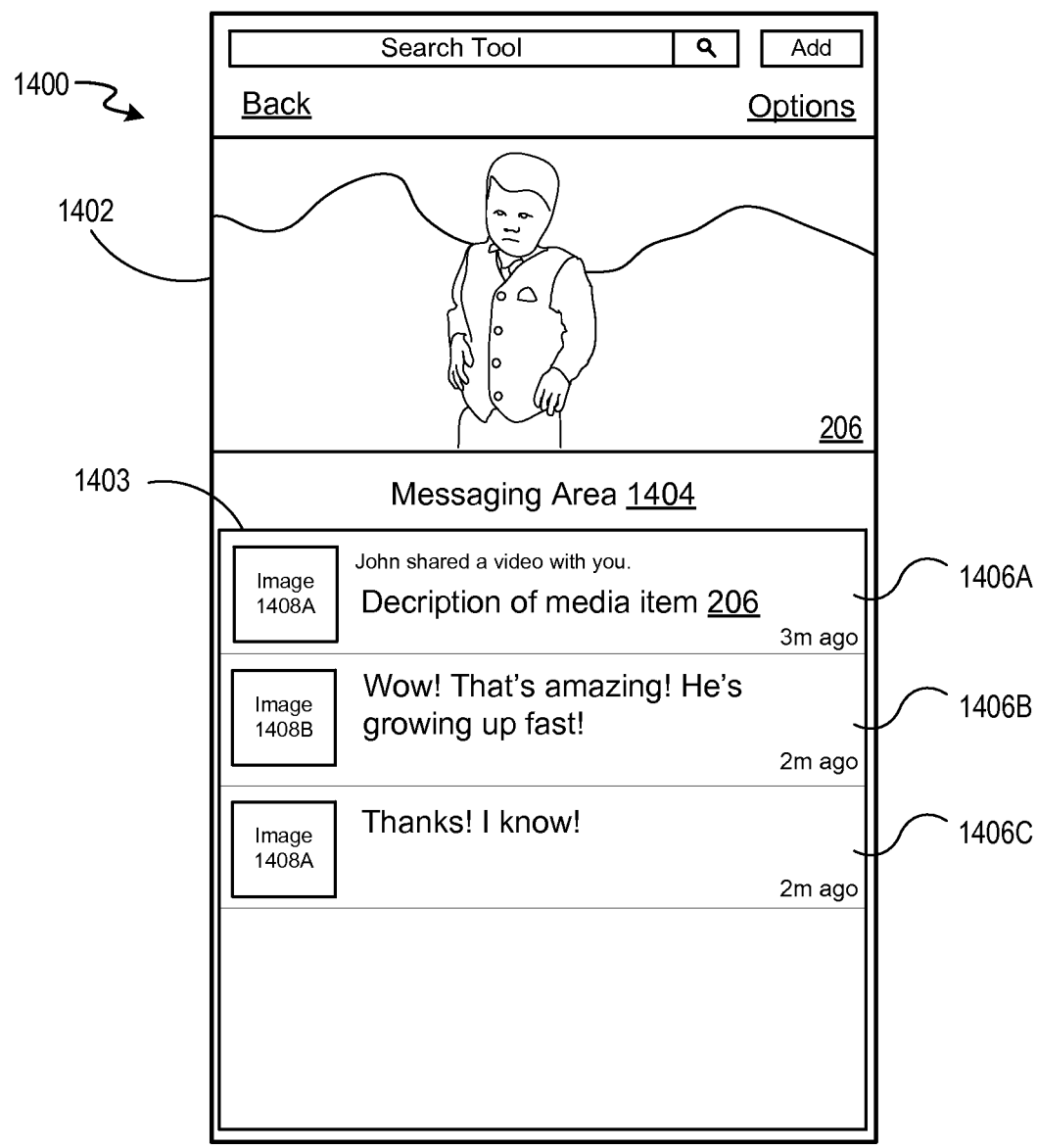
FIG. 14 illustrates an exemplary user interface for receiving a shared media item in a messaging session, according to some embodiments of the disclosure.
Figure 15:
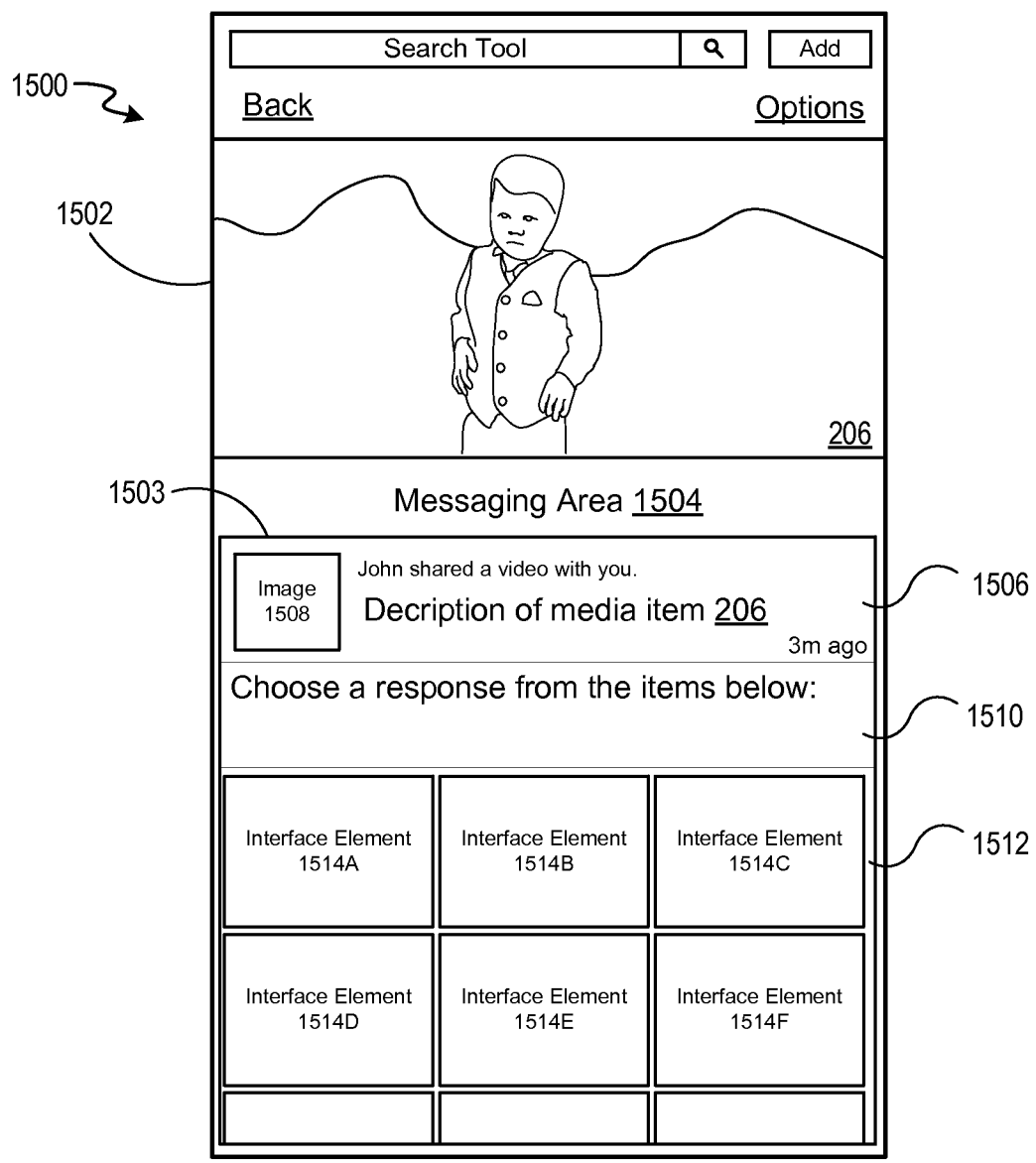
FIG. 15 is an exemplary user interface for selecting a responsive media item for inclusion in a reply in a messaging session initiated by the sharing of a media item, according to some aspects of the present disclosure.
Figure 16:
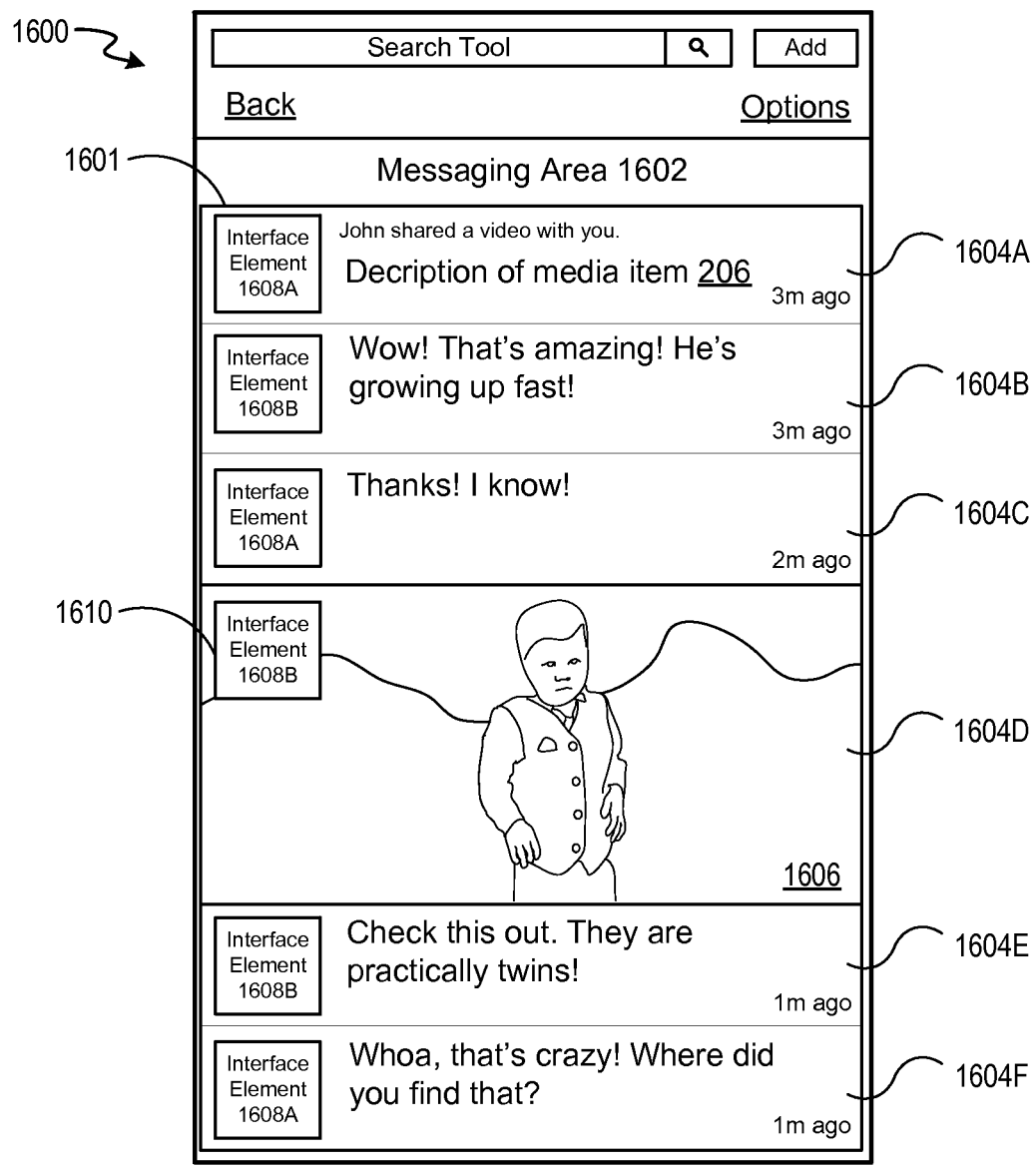
FIG. 16 illustrates an exemplary user interface for sharing media items in a messaging session, according to some aspects of the present disclosure.

The user interface 1300 illustrates a user interface as on a device of a contact to whom the media item 206 is shared by the user as described in connection with FIGS. 11A, 11B, and 12. The notification 1302 may include several different portions that indicate an identify of the user of the content-sharing platform 130 that shared the media item, indicate what the shared media item is, etc. The notification 1302 may include an image 1304, which may be an icon or other image representing the content-sharing platform 130 or a mobile application associated therewith. In some embodiments, the image 1304 may include an image or photo of the user that shared the media item. This image or photo of the user may be obtained from a contact list or contacts app operating on the device presenting the user interface 1300. The notification 1302 may additionally include a message 1306, which may notify the contact that the user has shared a media item with the contact. The message 1306 may indicate an identity of the user and other information. By manipulating the notification 1304As, such as by swiping or sliding on the notification 1302, the device presenting the user interface 1300 may be prompted to open an application to enable the contact to view the shared media item. Such an application may be a browser or a mobile app. FIGS. 14, 15, and 16 illustrate exemplary user interfaces showing how the media item may be received by a contact.

FIG. 14 illustrates an exemplary user interface 1400 that shows how a contact may receive a shared media item. FIG. 14 may be observed in connection with FIG. 12, according to some aspects of the present disclosure. While FIG. 12 illustrates a user interface as seen by the sharing user of the content-sharing platform 130, the user interface 1400 of FIG. 14 illustrates a user interface as seen by and presented to the receiving contact. As shown in FIG. 14, the user interface 1400 includes a media player portion 1402 in which the media item 206 is presented. Upon receipt of the media item 206, the device presenting the user interface 1400 may also join the messaging session 1403, which is displayed in a messaging area 1404. In some embodiments, the media player portion 1402 is incorporated directly into the messaging session 1403, such that it is displayed within the messaging area 1404.

As shown in FIG. 14, the messaging session 1402 include an initiating message 1406A. This initiating message 1406A may correspond to the initiating message 1204A of FIG. 12. The initiating message 1406A may be automatically generated when the user selected to share the media item 206 with the contact that is using the device presenting the user interface 1400. Additional messages 1406B and 1406C are included in the messaging session 1403. Each of the messages 1406A-C may include an image 1408A or 1408B depicting a sender of each respective message. Thus, as illustrated in FIG. 14, the image 1408B may be an image associated with the contact that received the message and is responding to the user in the messaging session 1403.

FIG. 15 illustrates an exemplary user interface 1500 by which a contact may select a responsive media item for inclusion in a reply in a messaging session initiated by the sharing of a media item, according to some aspects of the present disclosure. The user interface 1500 may include a media player portion 1502, which as shown displays the shared media item 206. The user interface 1500 further includes a messaging session 1503. The messaging session 1503 may include an initiating message 1506 that includes an image 1508 depicting the user that shared the media item 206. The user interface 1500 includes features that enable a contact to respond to the user that shared the media item 206 with a media item. The messaging session 1503 includes a prompt 1510 informing the contact that he or she may choose a media item from a media item list 1512 to share with the user in response to the media item 206.

The media item list 1512 may include a plurality of interface elements 1514A-F as shown below. Each of the interface elements 1514A may be selected by the contact to cause a corresponding media item to be shared with the user that sent the media item 206 and any other participants of the messaging session 1503. The interface elements 1514A-F may be thumbnail images or frames from videos. For example, the videos may be "video emojis" or short clips that convey an emotion. The videos may be brief, such as 5 seconds or less, or the videos may be longer. In some embodiments, one or more of the interface elements 1514A-F may be an audio clip or another media item other than a video.

Additionally, the interface element 1514A may be selected to permit the contact to use the user device to record a media item. Accordingly, some embodiments of the computer system 1000 of FIG. 10 may include a camera and/or a microphone as input devices in addition to the alphanumeric input device 1012 and the cursor control device 1014. Thus, upon selecting the interface element 1514A, which may include an image of a video camera or microphone, the contact may be provided a message recording interface to be able to record a message as a video clip or a sound clip. In some embodiments, the contact may be able to include a text-based message with the recorded message. The text-based message may be presented in a foreground of the message when the message is a video clip. The message recording interface may include controls to begin and stop recording, to reject and/or reject a recording, etc.

Some embodiments of the user interface 1500 may include media items stored in a local memory of the user device in the media item list 1512. Additionally, the media item list 1512 may include links to recently consumed media items or a saved list of media items. Thus, many different types of media items may be included in a response message by using embodiments to the user interface 1500.

FIG. 16 illustrates an exemplary user interface 1600 that may be used in a messaging session in which one or more media items are shared, according to some aspects of the present disclosure. The user interface 1600 includes a messaging session 1601 in a messaging area 1602. The messaging session 1601 includes an initiating message 1604A. This initiating message 1604A may be the same as the initiating message 1406A of FIG. 14, which was sent in connection with the sharing of the media item 206 with the selected contact.

The messaging session 1601 further includes messages 1604B-F. The message 1604D is a response message including a media item 1606, such as may be shared and sent by using the user interface 1500 of FIG. 15, described herein. Messages 1604E and 1604F are messages on the media item 1606, rather than the media item 206. Each of the messages 1604A-F may include a visual identifier or indicator of the sender of the message. The identifiers may be provided by the interface elements 1608A and 1608B. In particular, the message 1604D, which is the responsive media item 1606, includes an identifier 1610, which may be an image or photo of the sender of the message 1604D. As illustrated, the message 1604D includes a media item 1606 that is a video clip. When the video clip is selected for playing, the identifier 1610 may be hidden during the duration of the video clip to avoid obscuring the media item 1606.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "providing", "monitoring", "determining", "receiving", "identifying", "generating", "maintaining" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to a system for performing the operations herein. This system may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Reference throughout this specification to "one embodiment" or "an embodiment" means that a particular feature, structure, or characteristic described in connection with the embodiment is included in at least one embodiment. Thus, the appearances of the phrase "in some embodiments" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A computer-implemented method comprising:
providing a messaging area and a media viewing area within a user interface of a content-sharing application on a user device of a first user, wherein the media viewing area comprises a video player to play a media item to the first user;
receiving, by a processing device executing the content-sharing application on the user device of the first user, a personalized notification message comprising a photo of a second user of the content-sharing application and a reference to a media item shared by a second user with the first user;
presenting the personalized notification message in the messaging area of the user interface of the content-sharing application;
receiving, via the messaging area of the user interface, an indication from the first user to view the shared media item referenced in the personalized notification message; and
in response to receiving the indication from the first user to view the shared media item,
automatically initiating, by the content-sharing application, a messaging session on the user device of the first user, wherein the messaging session provides:
presentation of additional messages exchanged between the first user and the second user in the messaging area of the user interface of the content-sharing application, and
presentation of the shared media item within the media viewing area of the user interface of the content-sharing application, wherein the video player plays the shared media item to the first user during the messaging session.

2. The method of claim 1, automatically initiating the messaging session on the user device of the first user comprises:
adding the first user to an existing messaging session between a plurality of participants.

3. The method of claim 2, further comprising:
presenting to the first user messages of the existing messaging session that were exchanged prior to adding the first user to the existing messaging session.

4. The method of claim 2, further comprising:
after adding the first user to the existing messaging session, receiving a request of the first user to invite a contact to join the existing messaging session.

5. The method of claim 1, further comprising:
providing the first user with an option to select an additional media item from a media item list;
receiving a selection of the first user of the additional media item from the media item list; and
including the additional media item in a messaging session queue for presentation to the second user.

6. The method of claim 5, wherein the media item list comprises a local media item stored on the user device, a reference to a remote media item, or an option to create a new media item.

7. The method of claim 5, wherein the additional media item is presented in the messaging area of the user interface.

8. The method of claim 1 further comprising:
identifying contacts of the first user of the user device;
presenting to the first user a subset of the identified contacts to be invited to the messaging session using corresponding interface elements;
receiving a selection of one or more contacts from the subset of the identified contacts via corresponding interface elements, the selection indicating a request of the first user to share the media item with the selected contacts; and causing the messaging session with the media item to be provided to the selected contacts.

9. An apparatus comprising:
a user device of a first user;
a memory communicably coupled to the user device; and
a processing device communicably coupled to the memory, the processing device is to execute a content-sharing application to:
provide a messaging area and a media viewing area within a user interface of a content-sharing application on the user device, wherein the media viewing area comprises a video player to play a media item to the first user;
receive a personalized notification message for the first user, the notification message comprising a photo of a second user of the content-sharing application and a reference to a media item that was shared by a second user with the first user;
present the personalized notification message in the messaging area of a user interface of the content-sharing application;
receive, via the messaging are of the user interface, an indication from the first user to view the shared media item referenced in the personalized notification message; and
in response to receiving the indication from the first user to view the shared media item,
automatically initiate a messaging session on the user device of the first user, wherein the processing device is to:
present additional messages exchanged between the first user and the second user in the messaging area of the user interface of the content-sharing application, and
present the shared media item within the media viewing area of the user interface of the content-sharing application, wherein the video player is to play the shared media item to the first user during the messaging session.

10. The apparatus of claim 9, wherein to automatically initiate the messaging session on the user device of the first user, the processing device is further to add the first user to an existing messaging session between a plurality of participants.

11. The apparatus of claim 10, wherein the processing device is further to:
subsequent to adding the first user to the existing messaging session, receive a request of the first user to invite a contact to join the existing messaging session.

12. The apparatus of claim 9, wherein the processing device is further to:
provide the first user with an option to select an additional media item from a media item list;
receive a selection of the first user of the additional media item from the media item list; and
include the additional media item in a messaging session queue for presentation to the second user.

13. The apparatus of claim 12, wherein the additional media item is to be presented in the messaging area of the user interface.

14. The apparatus of claim 9, wherein the processing device is further to:
identify contacts of the first user of the user device;
present to the first user a subset of the identified contacts to be invited to the messaging session by corresponding interface elements;
receive a selection of one or more contacts from the subset of the identified contacts via corresponding interface elements, the selection to indicate a request of the first user to share the media item with the selected contacts; and
cause the messaging session with the media item to be provided to the selected contacts.

15. A non-transitory machine-readable storage medium storing instructions which, when executed, cause a processing device executing a content-sharing application on a user device to perform operations comprising:
providing a messaging area and a media viewing area within a user interface of the content-sharing application on the user device of a first user, wherein the media viewing area comprises a video player to play a media item to the first user;
receiving by the processing device of the user device of the first user, a personalized notification message comprising a photo of a second user of the content-sharing application and a reference to a media item shared by a second user with the first user;
presenting the personalized notification message in the messaging area of the user interface of the content-sharing application;
receiving, via the messaging area of the user interface, an indication from the first user to view the shared media item referenced in the personalized notification message; and
in response to receiving the indication from the first user to view the shared media item,
automatically initiating, by the content-sharing application, a messaging session on the user device of the first user, wherein the messaging session provides:
presentation of additional messages exchanged between the first user and the second user in the messaging area of the user interface of the content-sharing application, and
presentation of the shared media item within the media viewing area of the user interface of the content-sharing application, wherein the video player plays the shared media item to the first user during the messaging session.

16. The non-transitory machine-readable storage medium of claim 15, the operations further comprising:
identifying contacts of the first user of the user device;
presenting to the first user a subset of the identified contacts to be invited to the messaging session using corresponding interface elements;
receiving a selection of one or more contacts from the subset of the identified contacts via corresponding interface elements, the selection indicating a request of the first user to share the media item with the selected contacts; and
causing the messaging session with the media item to be provided to the selected contacts.

17. The non-transitory machine-readable storage medium of claim 16, the operations further comprising:
providing the first user with an option to select an additional media item from a media item list;
receiving a selection of the first user of the additional media item from the media item list; and
including the additional media item in a messaging session queue for presentation to the second user and selected contact.

18. The non-transitory machine-readable storage medium of claim 17, wherein the additional media item is presented in the messaging area of the user interface.

19. The non-transitory machine-readable storage medium of claim 18, the operations further comprising:
- identifying contacts of the first user of the user device;
- presenting to the first user a subset of the identified contacts to be invited to the messaging session by corresponding interface elements;
- receiving a selection of one or more contacts from the subset of the identified contacts via corresponding interface elements, the selection to indicate a request of the first user to share the media item with the selected contacts; and
- causing the messaging session with the media item to be provided to the selected contacts.

* * * * *